US012633214B2

(12) United States Patent
Harrison

(10) Patent No.: US 12,633,214 B2
(45) Date of Patent: *May 19, 2026

(54) UPDATING PATH BASED ON INFORMATION FROM CB RADIO

(71) Applicant: TORC Robotics, Inc., Blacksburg, VA (US)

(72) Inventor: Christopher Harrison, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 288 days.

This patent is subject to a terminal disclaimer.

(21) Appl. No.: 18/320,767

(22) Filed: May 19, 2023

(65) Prior Publication Data

US 2024/0386799 A1 Nov. 21, 2024

(51) Int. Cl.
*G08G 1/0967* (2006.01)
*G06F 40/279* (2020.01)

(52) U.S. Cl.
CPC ..... *G08G 1/096725* (2013.01); *G06F 40/279* (2020.01); *G08G 1/096791* (2013.01)

(58) Field of Classification Search
CPC ........ G08G 1/096725; G08G 1/096791; G06F 40/279
See application file for complete search history.

(56) References Cited

U.S. PATENT DOCUMENTS

| | | | |
|---|---|---|---|
| 3,984,807 A | 10/1976 | Haemmig | |
| 4,179,739 A | 12/1979 | Virnot | |
| 4,713,661 A | 12/1987 | Boone | |
| 6,407,673 B1 | 6/2002 | Lane | |
| 6,611,536 B1 | 8/2003 | Ahmed | |
| 7,398,050 B2 | 7/2008 | Walker | |
| 8,725,398 B2 | 5/2014 | Marko | |
| 10,716,292 B1 | 7/2020 | Fox | |
| 10,911,723 B2 | 2/2021 | Stumphauzer, II | |
| 11,417,328 B1 * | 8/2022 | Katta | G06F 40/20 |
| 2002/0004720 A1 | 1/2002 | Janoska | |
| 2003/0212996 A1 | 11/2003 | Wolzien | |
| 2011/0257812 A1 | 10/2011 | Carpenter | |
| 2014/0358394 A1 | 12/2014 | Picciotti | |
| 2019/0135109 A1 | 5/2019 | Miller, Jr. | |
| 2019/0306557 A1 | 10/2019 | Miller | |
| 2020/0051001 A1 * | 2/2020 | Donnelly | G06Q 50/40 |
| 2020/0075043 A1 * | 3/2020 | Kane | B60K 35/10 |
| 2020/0372796 A1 * | 11/2020 | Gajapala | G08G 1/0141 |
| 2021/0171046 A1 * | 6/2021 | Blott | G06Q 10/02 |
| 2023/0213938 A1 * | 7/2023 | Lee | B65G 1/065 |
| | | | 700/245 |
| 2023/0398959 A1 * | 12/2023 | Brown | B60R 25/31 |
| 2024/0386799 A1 * | 11/2024 | Harrison | G08G 1/096775 |

* cited by examiner

*Primary Examiner* — Hussein Elchanti
(74) *Attorney, Agent, or Firm* — Armstrong Teasdale LLP

(57) ABSTRACT

A system can receive audio data indicating speech from a citizens band (CB) radio channel. The system can determine a location corresponding to first information in the speech. The system can determine an event at the location based on the first information. The system can predict one or more autonomous vehicles that have a path including the location. The system can transmit second information containing the event and the location to the one or more autonomous vehicles. The second information can cause the one or more autonomous vehicles to adjust operation according to the event and the location.

20 Claims, 7 Drawing Sheets

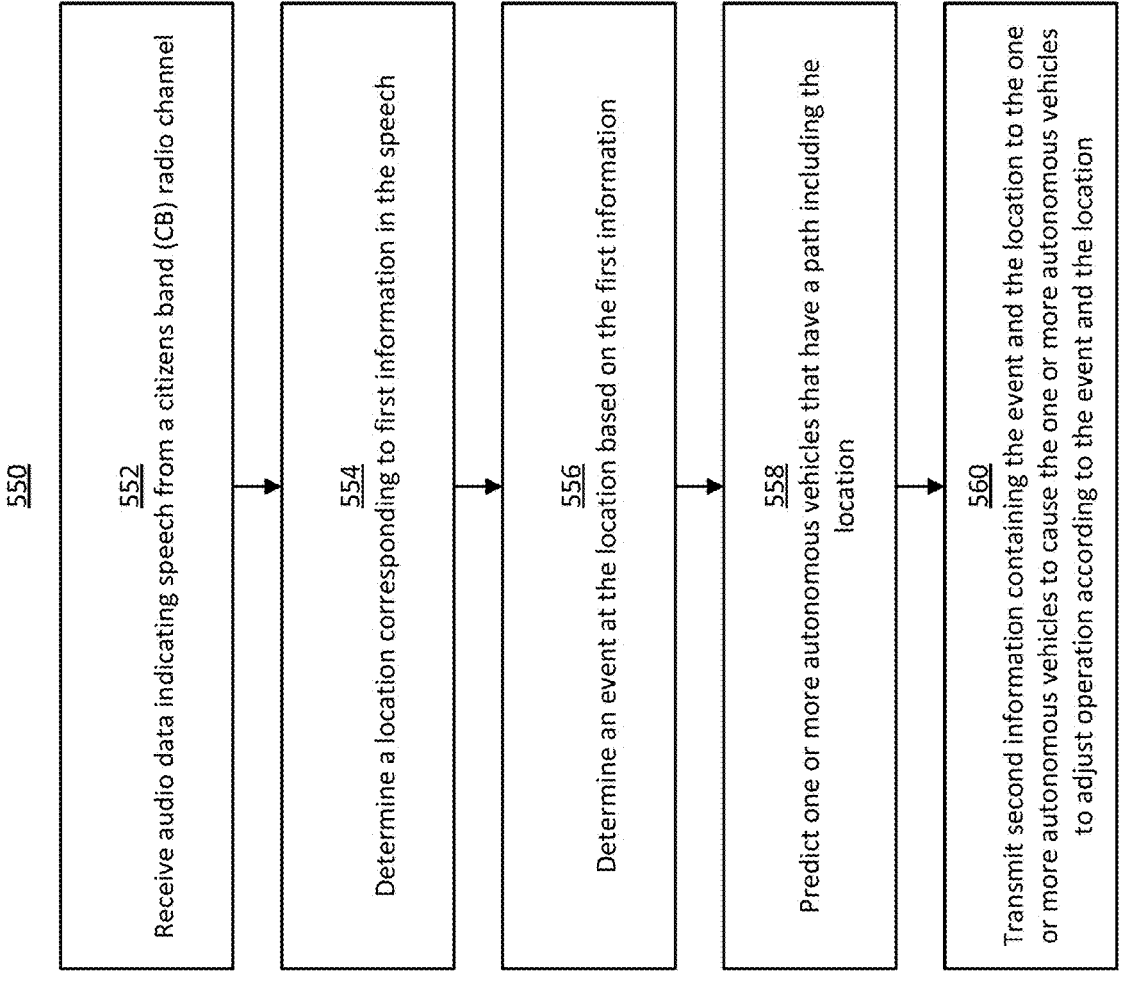

550

552
Receive audio data indicating speech from a citizens band (CB) radio channel 554
Determine a location corresponding to first information in the speech 556
Determine an event at the location based on the first information 558
Predict one or more autonomous vehicles that have a path including the location 560
Transmit second information containing the event and the location to the one or more autonomous vehicles to cause the one or more autonomous vehicles to adjust operation according to the event and the location

FIG. 5B

UPDATING PATH BASED ON INFORMATION FROM CB RADIO

TECHNICAL FIELD

The present disclosure relates generally to content detection from speech data and, more specifically, to autonomous vehicle control based on content detected from speech data.

BACKGROUND

The use of autonomous vehicles has become increasingly prevalent in recent years, with the potential for numerous benefits. One challenge faced by autonomous vehicles is operating with legacy equipment such as human operated non-autonomous vehicles. Various information sharing protocols can share data between appropriately equipped vehicles, such as autonomous vehicles. These protocols include Vehicle-to-Vehicle (V2V), Vehicle-to-infrastructure (V2i), and other autonomous-focused information sharing systems. These systems may provide different information from traditional systems to communicate with operator piloted vehicles (e.g., radio transmissions, stoplights, road signs, and so forth).

SUMMARY

Some approaches to vehicle autonomy fail to consider the information set employed by legacy vehicles. For example, the venerable citizens band (CB) radio is employed by human operators to exchange information relevant to one or more paths a vehicle may travel. Such systems can include information which may not be available to some autonomy-focused systems, such as V2V or V2i systems. For example, some information available to human operators may be relevant to an autonomous vehicle, such as because the information may include information not available to a V2V or V2i system, because a V2V or V2i system may not be employed in a region of interest, or because human behavior may impact traffic patterns and thus become relevant to an autonomous vehicle sharing the roads with a human-piloted vehicles.

Disclosed herein are techniques to improve autonomous vehicle control or operation based on audio data. Vehicle operators (e.g., tractor-trailer operators) can employ speech communication to describe events relevant to a path, such as along an interstate system, surface streets, or so forth. For example, the operators can speak into the CB radio, causing the CB radio to transmit audio data including the speech indicating a presence of an event such as a pothole, an erratic driver, a state of traffic (e.g., level of traffic, such as high, medium, low, or none), a road closure, an alternate route, etc. A band of transmission may be relevant to an event or location. For example, operators may allocate one channel for north-south routes and another channel for east-west routes, or include a separate channel for emergencies, weather, law enforcement communications, etc. Such allocations may be regional, informal, or otherwise include variances.

According to the systems and methods disclosed herein, the audio data, including the content of speech or other information encoded in a transmission, may be ingested (e.g., received and processed) by a data processing system such as a vehicle or a server. The data processing system can execute a natural language processing protocol to generate a transcript from the audio information and processed to determine information relevant to one or more events. For example, the transcript can include references to a location such as an intersection, border, municipality, or the like. The location can include a predefined area (e.g., a radius having a centroid at an estimated location), or exist along a road, route, region, municipality, or the like. In some cases, the systems and methods can determine a location based on the source of the audio data. For example, audio data which is relayed from an intermediate location to a data processing system (such as by one or more autonomous vehicles), may be indicative of a location which is proximal to the location of the intermediate location. Audio data detected at a server may be determined to be within a first distance from the server (e.g., according to the presence of the audio signal, the clarity or signal strength for the audio data, a direction of a directional antennae, or so forth). As indicated, above, the data processing system can determine the event based on the transcript, such as based on key words.

The data processing system may predict vehicles, such as autonomous vehicles, that may traverse a path approaching the determined location. The data processing system can be a part of an autonomous vehicle, or remote therefrom (e.g., the data processing system may be a remote server). The data processing system can receive location data from autonomous vehicles or destination locations from autonomous vehicle, and predict future path for the autonomous vehicles. In some cases, the data processing system may maintain a repository (e.g., database) of paths for autonomous vehicles. The data processing system can be a remote server receiving updates to paths based on vehicle operation, or providing updates to paths based on various input (e.g., weather, traffic patterns, road closures and the like). One or more vehicles may thereafter be identified as associated with the events (e.g., according to a vehicle type, cargo, or location). The data processing system can determine a vehicle path that includes the location (e.g., intersects the location, approaches within a predefined distance, etc.). For example, a vehicle having a path traversing a region within a window (e.g., one hour, 20 miles, etc.) may be predicted to include the location of the event, or based on a vehicle type (e.g., responsive to a weight restriction on a bridge, which may permit the passage of vehicles below a weight, or high winds, which may be particularly relevant to unloaded or lightweight vehicles).

The data processing system can provide information to the vehicle. The information can include an instruction or other information indicative of an action for the vehicle to take. For example, responsive to the receipt of the information, the vehicle can perform an action such as retransmission of the information; generation of an audial or visual indication such as engaging hazard warning lights or sounding a horn; or an execution of a navigational action adjusting a speed or direction such as determining and driving an alternate path, or changing a lane.

An embodiment of the present disclosure is directed to a system. The system includes one or more processors configured to receive audio data indicating speech from a citizens band (CB) radio channel. The one or more processors are configured to determine a location corresponding to first information in the speech. The one or more processors are configured to determine an event at the location based on the first information. The one or more processors are configured to predict one or more autonomous vehicles that have a path including the location. The one or more processors are configured to transmit second information containing the event and the location to the one or more autonomous vehicles. The second information can cause the one or more autonomous vehicles to adjust operation according to the event and the location.

Another embodiment of the present disclosure is directed to a method. The method may be performed by at least one processor of an autonomous vehicle traveling on a roadway or a server remote therefrom, for example. The method includes receiving audio data indicating speech from a citizens band (CB) radio channel. The method includes determining a location corresponding to first information in the speech. The method includes determining, by the data processing system, an event at the location based on the first information. The method includes predicting one or more autonomous vehicles that have a path including the location.

BRIEF DESCRIPTION OF THE DRAWINGS

The accompanying drawings, which are incorporated in and constitute a part of this specification, illustrate various exemplary embodiments and, together with the description, serve to explain the principles of the disclosed embodiments.

FIG. 5B is another flow diagram of an example method of determining an association between an event and a vehicle, according to some embodiments.

DETAILED DESCRIPTION

The following detailed description describes various features and functions of the disclosed systems and methods with reference to the accompanying figures. In the figures, similar components are identified using similar symbols, unless otherwise contextually dictated. The exemplary system(s) and method(s) described herein are not limiting, and it may be readily understood that certain aspects of the disclosed systems and methods can be variously arranged and combined, all of which arrangements and combinations are contemplated by this disclosure.

Figure 1:
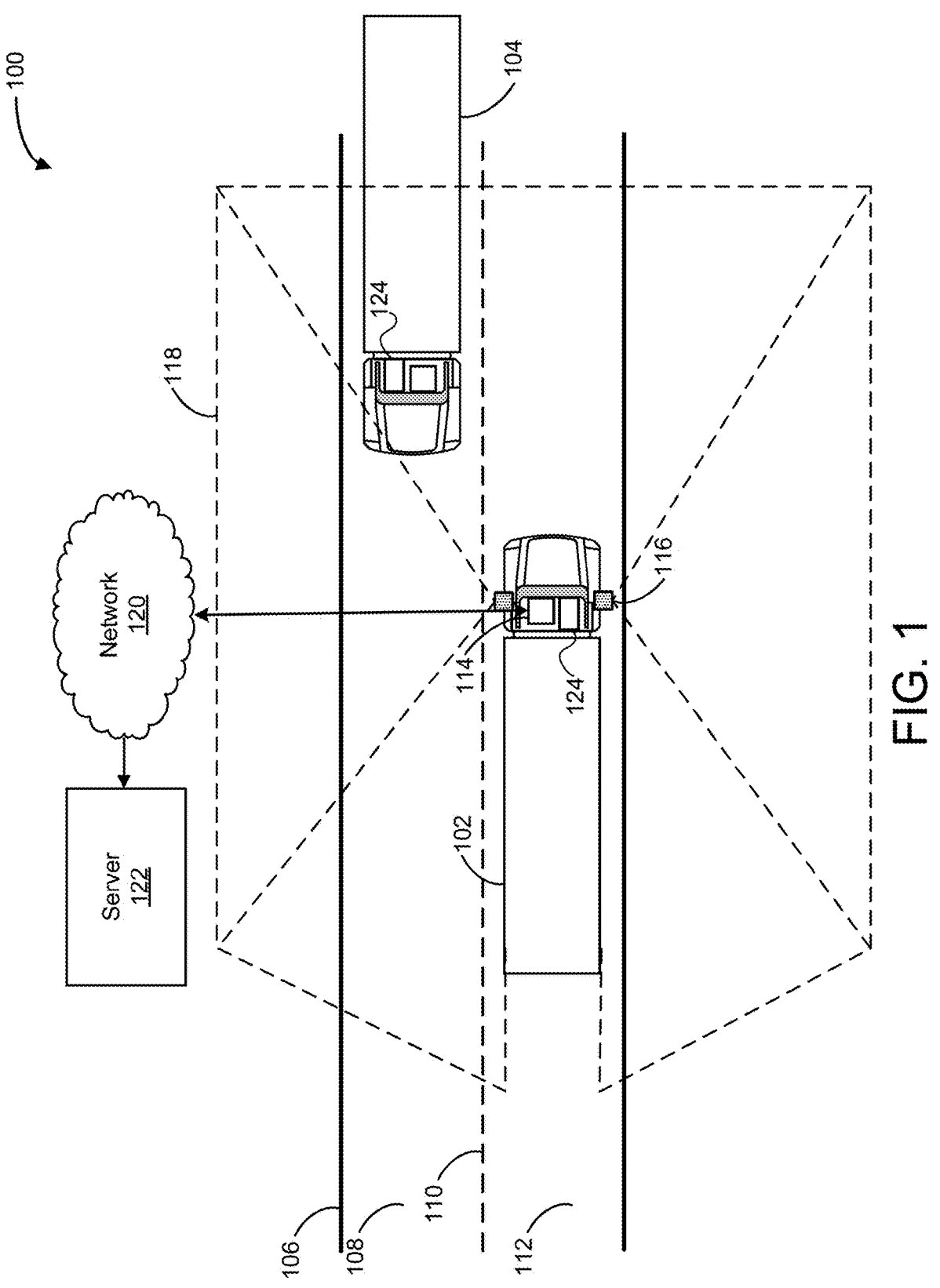
FIG. 1 is a bird's-eye view of a roadway including a schematic representation of a vehicle and aspects of an autonomy system of the vehicle, according to some embodiments.

Referring to FIG. 1, the present disclosure may relates to autonomous vehicles, such as an autonomous vehicle 102 having an autonomy system 114. The autonomy system 114 of the vehicle 102 may be completely autonomous (fully autonomous), such as self-driving, driverless, or Level 4 autonomy, or semi-autonomous, such as Level 3 autonomy. As used herein the term "autonomous" includes both fully autonomous and semi-autonomous. The autonomy system 114 may be structured on at least three aspects of technology: (1) perception, (2) maps/localization, and (3) behaviors planning and control. The function of the perception aspect is to sense an environment surrounding the vehicle 102 and interpret the environment. To interpret the surrounding environment, a perception module 116 or engine in the autonomy system 114 of the vehicle 102 may identify and classify objects or groups of objects in the environment. For example, a perception module 116 may be associated with various sensors (e.g., light detection and ranging (LiDAR), camera, radar, etc.) of the autonomy system 114 and may identify one or more objects (e.g., pedestrians, vehicles, debris, etc.) and features of the roadway (e.g., lane lines) around the vehicle 102, and classify the objects in the road distinctly. The perception module 116 may include or interface with a circuit for a CB radio 124. For example, the circuit can include a transceiver or receiver for the CB radio 124, configured to monitor at least one channel. The circuit for the CB radio 124 can monitor one or more amplitude modulation (AM) channels, frequency modulation (FM) channels, or side band (e.g., single side band (SSB)) channels.

The maps/localization aspect of the autonomy system 114 may be configured to determine where on a pre-established digital map the vehicle 102 is currently located. One way to do this is to sense the environment surrounding the vehicle 102 (e.g., via the perception module 116), such as by detecting vehicles (e.g., a vehicle 104) or other objects (e.g., traffic lights, speed limit signs, pedestrians, signs, road markers, etc.) from data collected via the sensors of the autonomy system 114, and to correlate features of the sensed environment with details (e.g., digital representations of the features of the sensed environment) on the digital map.

Once the systems on the vehicle 102 have determined the location of the vehicle 102 with respect to the digital map features (e.g., location on the roadway, upcoming intersections, road signs, etc.), the vehicle 102 can plan and execute maneuvers and/or routes with respect to the features of the digital map. The behaviors, planning, and control aspects of the autonomy system 114 may be configured to make decisions about how the vehicle 102 should move through the environment to get to the goal or destination of the vehicle 102. The autonomy system 114 may consume information from the perception and maps/localization modules to know where the vehicle 102 is relative to the surrounding environment and what other objects and traffic actors are doing.

FIG. 1 further illustrates an environment 100 for modifying one or more actions of the vehicle 102 using the autonomy system 114. The vehicle 102 is capable of communicatively coupling to a remote server 122 via a network 120. The vehicle 102 may not necessarily connect with the network 120 or the server 122 while it is in operation (e.g., driving down the roadway). That is, the server 122 may be remote from the vehicle, and the vehicle 102 may deploy with all the necessary perception, localization, and vehicle control software and data necessary to complete the vehicle 102's mission fully autonomously or semi-autonomously.

While this disclosure refers to a vehicle 102 as the autonomous vehicle, it is understood that the vehicle 102 could be any type of vehicle including a truck (e.g., a tractor trailer), an automobile, a mobile industrial machine, etc. While the disclosure will discuss a self-driving or driverless autonomous system, it is understood that the autonomous system could alternatively be semi-autonomous having varying degrees of autonomy or autonomous functionality. While the perception module 116 is depicted as being located at the front of the vehicle 102, the perception module 116 may be a part of a perception system with various sensors placed at different locations throughout the vehicle 102.

Figure 2:
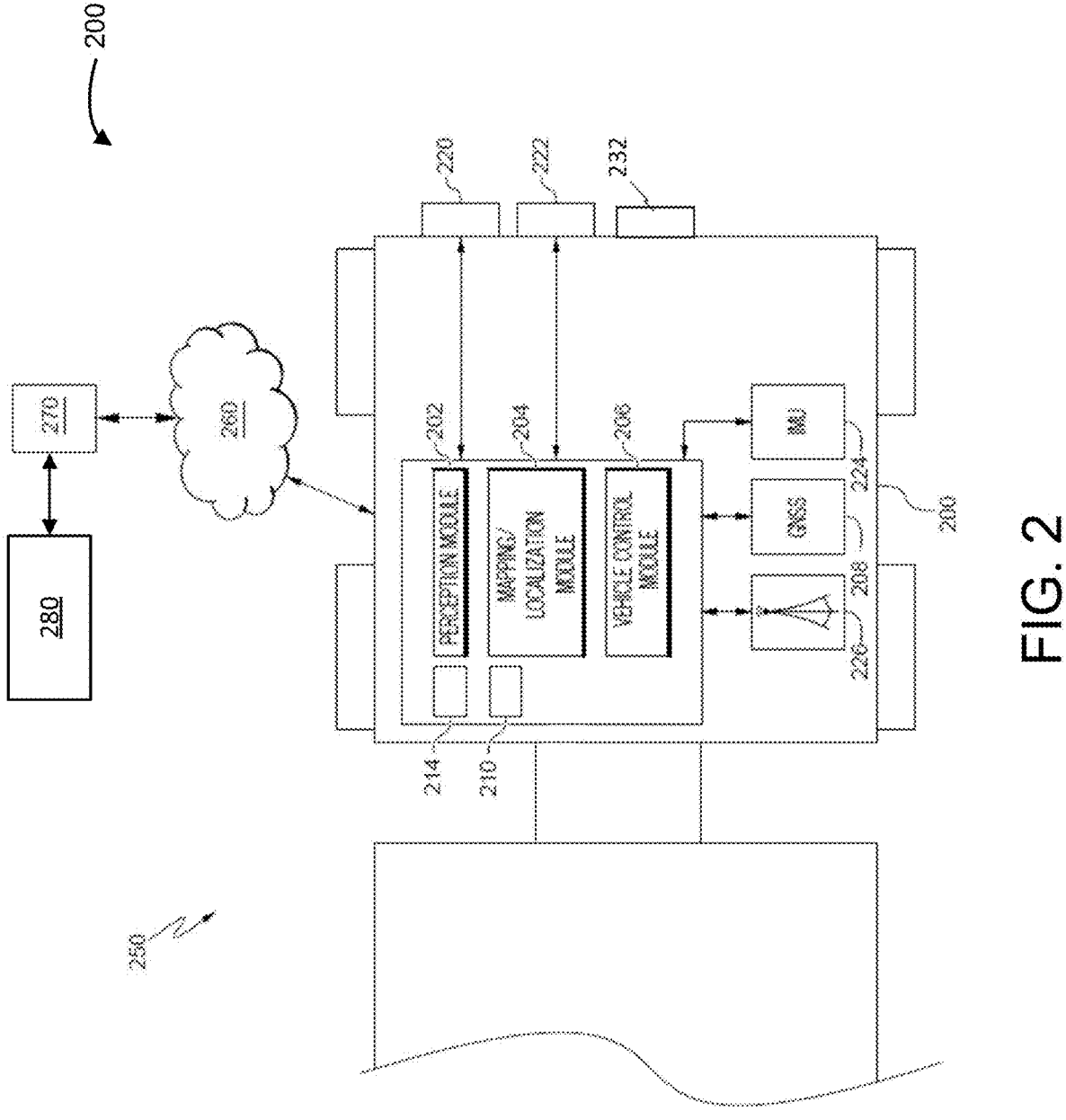
FIG. 2 is a system for determining deviations between observed and expected trajectories of vehicles, according to some embodiments.

FIG. 2 illustrates an example schematic of an autonomy system 250 of a vehicle 200, according to some embodiments. The autonomy system 250 may be the same as or similar to the autonomy system 114 depicted in FIG. 1. The vehicle 200 may be the same as or similar to the vehicle 102. The autonomy system 250 may include a perception system including a camera system 220, a LiDAR system 222, a radar system 232, a Global Navigation Satellite System (GNSS) receiver 208, an inertial measurement unit (IMU) 224, and/or a perception module 202. The autonomy system 250 may further include a transceiver 226, a processor 210, a memory 214, a mapping/localization module 204, and a vehicle control module 206. The various systems may serve as inputs to and receive outputs from various other components of the autonomy system 250. In other examples, the autonomy system 250 may include additional, fewer, or different components or systems, and each of the components or system(s) may include additional, fewer, or different components. Additionally, the systems and components shown may be combined or divided in various ways. As shown in FIG. 1, the perception systems aboard the autonomous vehicle may help the vehicle 102 perceive the vehicle 102's environment out to a perception area 118. The actions of the vehicle 102 may depend on the extent of the perception area 118. It is to be understood that the perception area 118 is an example area, and the practical area may be greater than or less than what is depicted.

The camera system 220 of the perception system may include one or more cameras mounted at any location on the vehicle 102, which may be configured to capture images of the environment surrounding the vehicle 102 in any aspect or field of view (FOV). The FOV can have any angle or aspect such that images of the areas ahead of, to the side, and behind the vehicle 102 may be captured. In some embodiments, the FOV may be limited to particular areas around the vehicle 102 (e.g., forward of the vehicle 102) or may surround 360 degrees of the vehicle 102. In some embodiments, the image data generated by the camera system(s) 220 may be sent to the perception module 202 and stored, for example, in memory 214.

The LiDAR system 222 may include a laser generator and a detector and can send and receive LiDAR signals. A LiDAR signal can be emitted to and received from any direction such that LiDAR point clouds (or "LiDAR images") of the areas ahead of, to the side, and behind the vehicle 200 can be captured and stored as LiDAR point clouds. In some embodiments, the vehicle 200 may include multiple LiDAR systems and point cloud data from the multiple systems may be stitched together.

The radar system 232 may estimate strength or effective mass of an object, as objects made out of paper or plastic may be weakly detected. The radar system 232 may be based on 24 GHz, 77 GHz, or other frequency radio waves. The radar system 232 may include short-range radar (SRR), mid-range radar (MRR), or long-range radar (LRR). One or more sensors may emit radio waves, and a processor may process received reflected data (e.g., raw radar sensor data) from the emitted radio waves.

In some embodiments, the system inputs from the camera system 220, the LiDAR system 222, and the radar system 232 may be fused (e.g., in the perception module 202). The LiDAR system 222 may include one or more actuators to modify a position and/or orientation of the LiDAR system 222 or components thereof. The LiDAR system 222 may be configured to use ultraviolet (UV), visible, or infrared light to image objects and can be used with a wide range of targets. In some embodiments, the LiDAR system 222 can be used to map physical features of an object with high resolution (e.g., using a narrow laser beam). In some examples, the LiDAR system 222 may generate a point cloud and the point cloud may be rendered to visualize the environment surrounding the vehicle 200 (or object(s) therein). In some embodiments, the point cloud may be rendered as one or more polygon(s) or mesh model(s) through, for example, surface reconstruction. Collectively, the radar system 232, the LiDAR system 222, and the camera system 220 may be referred to herein as "imaging systems."

The GNSS receiver 208 may be positioned on the vehicle 200 and may be configured to determine a location of the vehicle 200 via GNSS data, as described herein. Such a location may be referred to as geolocation data. The GNSS receiver 208 may be configured to receive one or more signals from a global navigation satellite system (GNSS) (e.g., a GPS) to localize the vehicle 200 via geolocation. The GNSS receiver 208 may provide an input to and otherwise communicate with the mapping/localization module 204 to, for example, provide location data for use with one or more digital maps, such as an HD map (e.g., in a vector layer, in a raster layer or other semantic map, etc.). In some embodiments, the GNSS receiver 208 may be configured to receive updates from an external network.

The inertial measurement unit (IMU) 224 may be an electronic device that measures and reports one or more features regarding the motion of the vehicle 200. For example, the IMU 224 may measure a velocity, acceleration, angular rate, and/or an orientation of the vehicle 200 or one or more of the vehicle 200's individual components using a combination of accelerometers, gyroscopes, and/or magnetometers. The IMU 224 may detect linear acceleration using one or more accelerometers and rotational rate using one or more gyroscopes. In some embodiments, the IMU 224 may be communicatively coupled to the GNSS receiver 208 and/or the mapping/localization module 204 to help determine a real-time location of the vehicle 200 and predict a location of the vehicle 200 even when the GNSS receiver 208 cannot receive satellite signals.

The transceiver 226 may be configured to communicate with one or more external networks 260 or devices via, for example, a wired or wireless connection in order to send and receive information (e.g., to a remote server 270). The wireless connection may be a wireless communication signal (e.g., Wi-Fi, cellular, LTE, 5G, etc.). The wireless connection can include a radio connection to one or more CB radios 124 which can receive audio content indicative of speech. The audio content may further include or be associated with a signal amplitude of other indication of energy. The indication of energy can differ in one or more planes or locations which may be indicative of an origin of the transmission (e.g., of the location of the CB radios 124 or a vehicle associated therewith). The transceiver 226 can exchange information received via one or more devices. For example, the transceiver 226 can convey audio data received from the CB radio 124 to via another network, such as a wireless TCP/IP network, or relay the communication through a transmission of the CB radio 124. In some embodiments, the transceiver 226 may be configured to communicate with external network(s) via a wired connection, such as, for example, during initial installation, testing, or service of the autonomy system 250 of the vehicle 200. A wired/wireless connection may be used to download and install various lines of code in the form of digital files (e.g., HD digital maps), executable programs (e.g., navigation programs), and other computer-readable code that may be used by the system 250 to navigate the vehicle 200 or otherwise operate the vehicle 200, either fully autonomously or semi-autonomously. The transceiver 226 can detect information, selectively, based on a path of travel. For example, the transceiver 226 can monitor a CB Radio channel associated with a north-south highway while traveling north along the highway, or may monitor a channel requested by the server 122.

The remote server 270 can communicate with further network devices such as a second remote server 280. The second remote server 280 can be or be in network communication with another vehicle 200, or another device in network communication therewith. The remote server 270 and the second remote server 280 can exchange any of the information conveyed between the other network devices disclosed herein. For example, the vehicle 200 can be a node of a mesh, hierarchical, or other network of computing devices that communicate with the second remote server 280.

The processor 210 of autonomy system 250 may be embodied as one or more of a data processor, a microcontroller, a microprocessor, a digital signal processor, a logic circuit, a programmable logic array, or one or more other devices for controlling the autonomy system 250 in response to one or more of the system inputs. The autonomy system 250 may include a single microprocessor or multiple microprocessors that may include means for controlling the vehicle 200 to switch lanes and monitoring and detecting other vehicles. Numerous commercially available microprocessors can be configured to perform the functions of the autonomy system 250. It should be appreciated that the autonomy system 250 could include a general machine controller capable of controlling numerous other machine functions. Alternatively, a special-purpose machine controller could be provided. Further, the autonomy system 250, or portions thereof, may be located remote from the system 250. For example, one or more features of the mapping/localization module 204 could be located remote to the vehicle 200. Various other known circuits may be associated with the autonomy system 250, including signal-conditioning circuitry, communication circuitry, actuation circuitry, and other appropriate circuitry.

Figure 5A:
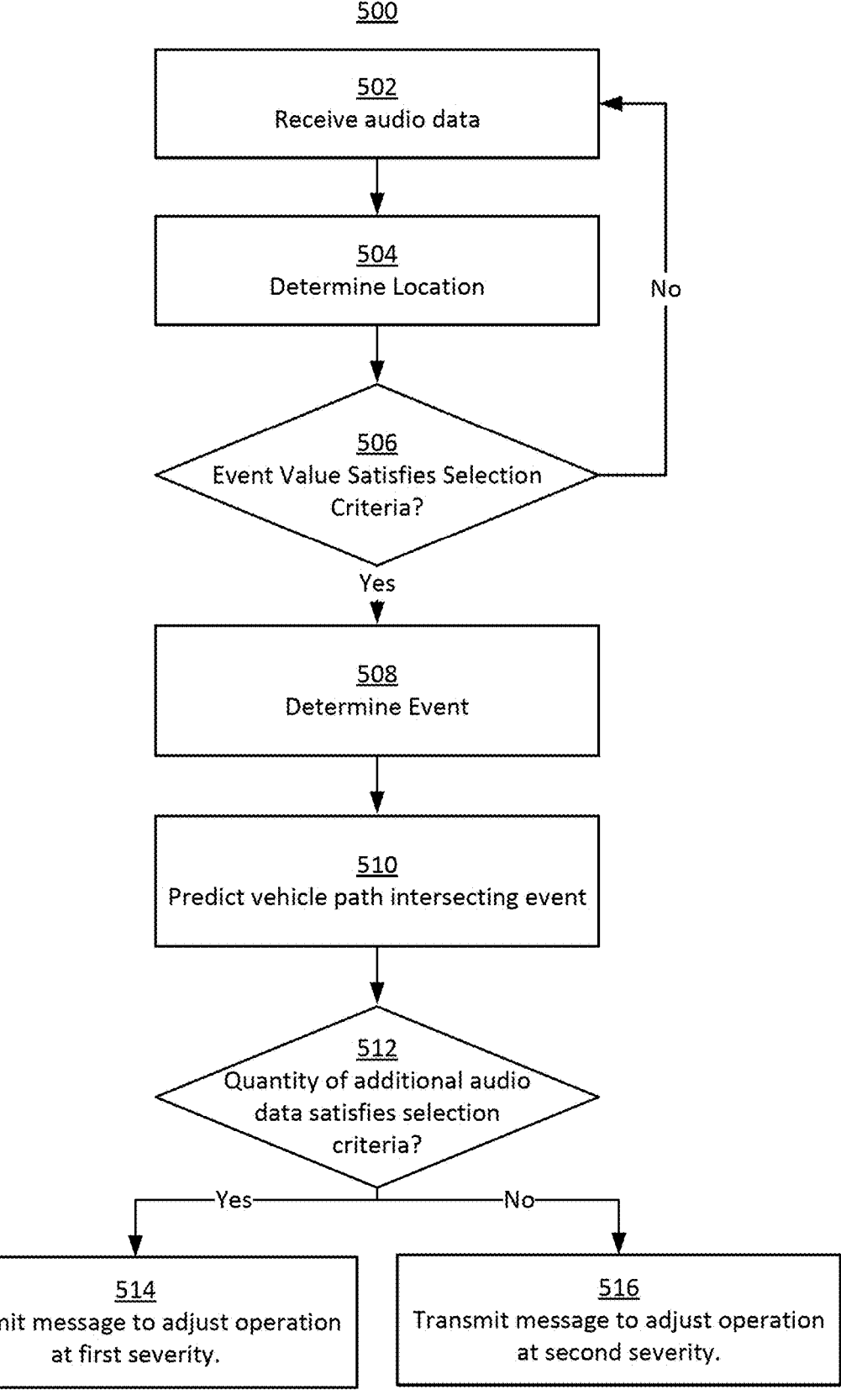
FIG. 5A is a flow diagram of an example method of determining an association between an event and a vehicle, according to some embodiments.

The memory 214 of the autonomy system 250 may store data and/or software routines that may assist the autonomy system 250 in performing autonomy system 250's functions, such as the functions of the perception module 202, the mapping/localization module 204, the vehicle control module 206, and the methods 500, 550 described herein with respect to FIG. 5A or FIG. 5B. Further, the memory 214 may also store data received from various inputs associated with the autonomy system 250, such as perception data from the perception system.

As noted above, the perception module 202 may receive input from the various sensors, such as the camera system 220, the LiDAR system 222, the GNSS receiver 208, and/or the IMU 224 (collectively "perception data") to sense an environment surrounding the vehicle 200 and interpret it. To interpret the surrounding environment, the perception module 202 (or "perception engine") may identify and classify objects or groups of objects in the environment. For example, the vehicle 102 may use the perception module 202 to identify one or more objects (e.g., pedestrians, vehicles, debris, etc.) or features of the roadway 106 (e.g., intersections, road signs, lane lines, etc.) before or beside a vehicle and classify the objects in the road. In some embodiments, the perception module 202 may include an image classification function and/or a computer vision function.

The system 250 may collect perception data. The perception data may represent the perceived environment surrounding the vehicle, for example, and may be collected using aspects of the perception system described herein. The perception data can come from, for example, one or more of the LiDAR system, the camera system, the radar system and various other externally-facing sensors and systems on board the vehicle (e.g., the GNSS receiver, etc.). For example, in vehicles having a sonar or radar system, the sonar and/or radar systems may collect perception data. As the vehicle 102 travels along the roadway 106, the system 250 may continually receive data from the various systems on the vehicle 102. In some embodiments, the system 250 may receive data periodically and/or continuously. With respect to FIG. 1, the vehicle 102 may collect perception data that indicates the presence of the lane line 110 (e.g., in order to determine the lanes 108 and 112). Additionally, the detection systems may detect the vehicle 104 and monitor the vehicle 104 to estimate various properties of the vehicle 104 (e.g., proximity, speed, behavior, flashing light, etc.). The properties of the vehicle 104 may be stored as time-series data in which timestamps indicate the times in which the different properties were measured or determined. The features may be stored as points (e.g., vehicles, signs, small landmarks, etc.), lines (e.g., lane lines, road edges, etc.), or polygons (e.g., lakes, large landmarks, etc.) and may have various properties (e.g., style, visible range, refresh rate, etc.), which properties may control how the system 250 interacts with the various features.

The image classification function may determine the features of an image (e.g., a visual image from the camera system 220 and/or a point cloud from the LiDAR system 222). The image classification function can be any combination of software agents and/or hardware modules able to identify image features and determine attributes of image parameters in order to classify portions, features, or attributes of an image. The image classification function may be embodied by a software module that may be communicatively coupled to a repository of images or image data (e.g., visual data and/or point cloud data) which may be used to determine objects and/or features in real-time image data captured by, for example, the camera system 220 and the LiDAR system 222. In some embodiments, the image classification function may be configured to classify features based on information received from only a portion of the multiple available sources. For example, in the case that the captured visual camera data includes images that may be blurred, the system 250 may identify objects based on data from one or more of the other systems (e.g., the LiDAR system 222) that does not include the image data.

The computer vision function may be configured to process and analyze images captured by the camera system 220 and/or the LiDAR system 222 or stored on one or more modules of the autonomy system 250 (e.g., in the memory 214), to identify objects and/or features in the environment surrounding the vehicle 200 (e.g., lane lines). The computer vision function may use, for example, an object recognition algorithm, video tracing, one or more photogrammetric range imaging techniques (e.g., a structure from motion (SFM) algorithms), or other computer vision techniques. The computer vision function may be configured to, for example, perform environmental mapping and/or track object vectors (e.g., speed and direction). In some embodiments, objects or features may be classified into various object classes using the image classification function, for instance, and the computer vision function may track the one or more classified objects to determine aspects of the classified object (e.g., aspects of the vehicle 200's motion, size, etc.)

The mapping/localization module 204 receives perception data that can be compared to one or more digital maps stored in the mapping/localization module 204 to determine where the vehicle 200 is in the world and/or where the vehicle 200 is on the digital map(s). In particular, the mapping/localization module 204 may receive perception data from the perception module 202 and/or from the various sensors sensing the environment surrounding the vehicle 200 and correlate features of the sensed environment with details (e.g., digital representations of the features of the sensed environment) on the one or more digital maps. The digital map may have various levels of detail and can be, for example, a raster map, a vector map, etc. The digital maps may be stored locally on the vehicle 200 and/or stored and accessed remotely.

The vehicle control module 206 may control the behavior and maneuvers of the vehicle 200. For example, once the systems on the vehicle 200 have determined the vehicle 200's location with respect to map features (e.g., intersections, road signs, lane lines, etc.) the vehicle 200 may use the vehicle control module 206 and the vehicle 200's associated systems to plan and execute maneuvers and/or routes with respect to the features of the environment. The vehicle control module 206 may make decisions about how the vehicle 200 will move through the environment to get to the vehicle 200's goal or destination as it completes the vehicle 200's mission. The vehicle control module 206 may consume information from the perception module 202 and the mapping/localization module 204 to know where it is relative to the surrounding environment and what other traffic actors are doing.

The vehicle control module 206 may be communicatively and operatively coupled to a plurality of vehicle operating systems and may execute one or more control signals and/or schemes to control operation of the one or more operating systems, for example, the vehicle control module 206 may control one or more of a vehicle steering system, a propulsion system, and/or a braking system. The propulsion system may be configured to provide powered motion for the vehicle 200 and may include, for example, an engine/motor, an energy source, a transmission, and wheels/tires and may be coupled to and receive a signal from a throttle system, for example, which may be any combination of mechanisms configured to control the operating speed and acceleration of the engine/motor and thus, the speed/acceleration of the vehicle 200. The steering system may be any combination of mechanisms configured to adjust the heading or direction of the vehicle 200. The brake system may be, for example, any combination of mechanisms configured to decelerate the vehicle 200 (e.g., friction braking system, regenerative braking system, etc.) The vehicle control module 206 may be configured to avoid obstacles in the environment surrounding the vehicle 200 and may be configured to use one or more system inputs to identify, evaluate, and modify a vehicle trajectory. The vehicle control module 206 is depicted as a single module, but can be any combination of software agents and/or hardware modules able to generate vehicle control signals operative to monitor systems and control various vehicle actuators. The vehicle control module 206 may include a steering controller for vehicle lateral motion control and a propulsion and braking controller for vehicle longitudinal motion.

The vehicle control module 206 can select an action based on one or more weights, confidences (e.g., confidence intervals), or other criteria. The vehicle control module 206 can receive information to adjust weight confidences, or other criteria. The information received by the vehicle control module 206, from the server 122, can include an adjustment to a weight, confidence, or other criteria, such as to cause the autonomous vehicle to brake in response to a detected object an earlier point in time that would otherwise be performed. For example, the autonomous vehicle 102 can receive an indication of congestion. In response to the indication, the autonomous vehicle 102 can adjust a weight relating to a path of travel. Subsequently, the autonomous vehicle 102 can detect a local indication of congestion from a vehicle sensor. Based on the combination of the indication of congestion received from the server 122 and the local indication of congestion received from the vehicle sensor, the autonomous vehicle can determine an alternate path to avoid the congestion, and change speed and direction to navigate the alternate path.

The vehicle control module 206 can receive information related to an indication of an event received from the transceiver 226 of the vehicle 200, such as from the server 122 of FIG. 1, or from another component of the vehicle 200. The information can cause the vehicle to execute navigation or non-navigational actions. For example, the vehicle control module 206 can receive explicit instructions for an action, such as a speed restriction, a path to traverse, or an indicator signal to engage. The vehicle control module 206 may convey the indication to the autonomy system 250 for execution. For example, the vehicle control module 206 can provide the autonomy system 250 with a path or lane guidance, and the autonomy system 250 may cause the vehicle to navigate the path, move the vehicle to the indicated lane, or the like. The autonomy system 250 can continue to control the autonomous vehicle 102 responsive to information received from, for example, the perception module 202 and the mapping/localization module 204. For example, the autonomy system 250 may cause the vehicle to deviate from an instruction to navigate in a leftmost lane responsive to a detection of foreign objects or debris in the left lane, or may deviate from an instruction to navigate a particular path responsive to signage detected which is contrary to the instruction, such as a detour from the path or other path data 326.

The information received at the vehicle control module 206 may be indicative of an event along a path of the vehicle. For example, the event can include a road closure, a speed of traffic along a roadway being less than a predefined threshold; an identification of a defined object along the roadway, congestion, or the like. The vehicle control module 206 can determine an action to execute to adjust an operation of the vehicle 200. The adjustment can include an execution of a navigational or non-navigational action. The vehicle control module 206 can execute the adjustment based on a combination of the received information and information sensed locally. For example, responsive to receiving information indicating congestion on a future portion of the path due to an accident in a leftmost lane, and a lack of congestion on a current heading, the vehicle control module 206 can determine and traverse an alternate path. Responsive to receiving information indicating congestion on a future portion of the path due to an accident in a leftmost lane, and a presence of congestion on a current heading, the vehicle control module 206 can adjust a lane position to a rightmost lane. Likewise, upon receiving information indicative of an event shortly in front of the vehicle 200, but which is not detectable by one or more sensors (as in the case of a blind corner or over a hill), the vehicle 200 can engage hazard warning lights, and apply maximum brake pressure, wherein upon a detection of the event with a vision sensor, the vehicle 200 may apply a lesser portion of braking pressure or may not engage hazard warning lights (e.g., because a distance may be more accurately predicted with the vision sensor than based on the information, or because other drivers may be expected to anticipate the braking based on an observable obstacle).

Figure 3:
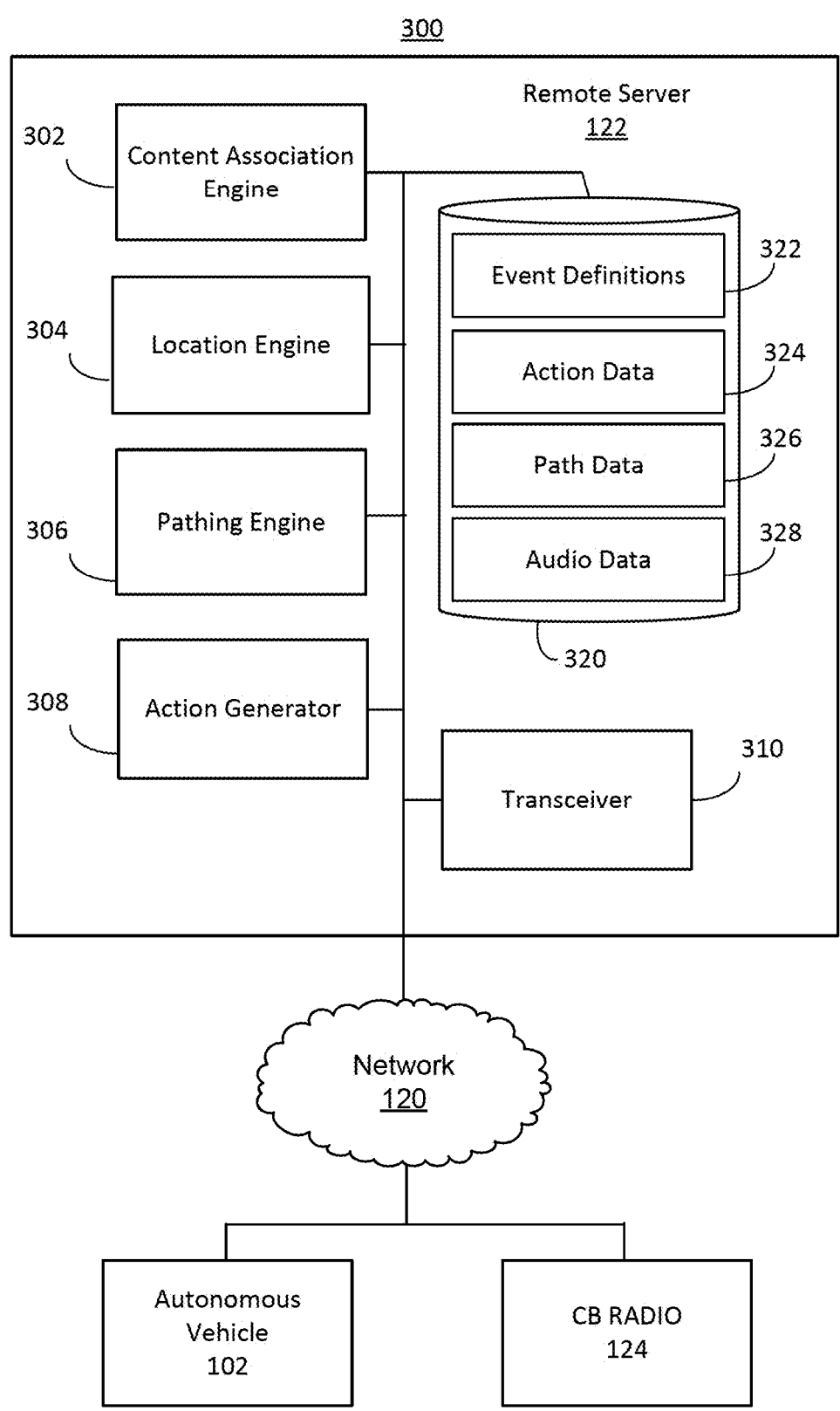
FIG. 3 is a block diagram for a server, such as the server of FIG. 1, according to some embodiments.

Referring to FIG. 3, a block diagram for a system 300 including a server 122, such as the server 122 of FIG. 1, is provided, according to some embodiments. The server 122 can determine events and associated locations based on audio data, such as audio content received over a citizens band (CB) radio 124. In some embodiments, the server 122 includes, interfaces with, is a component of, is hosted by, or otherwise integrates with an autonomous vehicle 102. For example, the data processing system can be integrated into an autonomous vehicle 102 to control the operation of said autonomous vehicle 102 (along with zero or more additional vehicles), or can be disposed separately therefrom to control the operation of one or more autonomous vehicles 102 connected thereto. A server 122 which is located remote from the autonomous vehicle 102 may be referred to as a remote server 122, such as the server 122 shown and described with reference to FIG. 1 or the remote server 270 shown and described with reference to FIG. 2. A remote server 122 may be distributed across one or more processors, locations, or entities. For example, the various components can communicate over the network 120 to exchange information therebetween or with the one or more autonomous vehicles 102.

The server 122 can include or otherwise interface with at least one content association engine 302, location engine 304, pathing engine 306, action generator 308, or transceiver 310, each of which may include at least one processing unit or other logic device such as a programmable logic array engine, or module configured to communicate with the data repository 320 or database. The content association engine 302, location engine 304, pathing engine 306, action generator 308, or transceiver 310 can be separate components, a single component, or part of the server 122, and can include or interface with, or be components of, a vehicle navigation system for one or more autonomous vehicles 102. The server 122 can include hardware elements, such as one or more processors, logic devices, or circuits. For example, the server 122 can include one or more components or structures of functionality of computing devices depicted in FIG. 6. The various components of the server 122 can be in network communication via various public or private networks such as a controller area networks (CAN), Ethernet, The Internet, or any number of other wired or wireless networks.

The at least one transceiver 310 can include a wired or wireless connection between the vehicle and the server 122. The wired or wireless connection can be or include the various connection types of the transceiver 226 of the vehicle 200 (e.g., the autonomous vehicle 102). For example, the transceiver 310 may be in network communication with the transceiver 226 of the vehicle 200 over a same network 120 or network connection type (e.g., Wi-Fi, cellular, Ethernet, CAN, or the like). The transceiver 310 can monitor a CB radio channel. For example, the transceiver can include or be in network communication with a CB radio 124 receiver. The transceiver 310 can monitor multiple CB radio channels simultaneously. The transceiver 310 can include multiple measures of a same CB radio channel (e.g., to determine a time-delay, directionality, or to achieve spatial or spectral diversity).

The data repository 320 can include one or more local or distributed databases, and can include a database management system. The data repository 320 can include computer data storage or memory and can store one or more data structures, such as an event definition 322, action data 324, path data 326, or audio data 328.

An event definition 322 may include or refer to a list of predefined events associated with speech. For example, each event can correspond to a coordinate, area, cluster, or other representation of a data structure corresponding to an event. For example, the data structure can include representations for traffic accidents, congestion, environmental hazards, potholes, objects disposed on a roadway, objects of interest not in the roadway, road construction, false positive indications, false negative indications, or so forth. The event definition 322 can include a list of associated words (e.g., word vectors). For example, an event of a traffic accident may correspond to words such as "wreck" "crash" "fire" "slowdown" "ambulance" and so forth. Each word can include a weight corresponding to an event definition 322. For example, the word "ambulance" may correspond to "traffic accident" with a first weight, and to environmental hazard with a second weight. In various embodiments, n-grams or other combinations or portions of words or speech may correspond to the events. For example, the "events" referred to herein may correspond to one or more event definitions 322. In some embodiments, an event definition 322 may correspond to more than one event. For example, a sinkhole, rockslide, or utility repair blocking a lane of a multi-lane roadway may correspond to a same or separate event definition 322, based on overlapping responses or traffic behavior associated with each.

Action data 324 may include or refer to information associated with an action taken by a vehicle, such as an autonomous vehicle 102. The action data can be generated by the server for conveyance to the autonomous vehicle 102. The action data 324 can include an explicit recitation of the action, such as a lane change, speed restriction, path to transit, or so forth. The action data 324 may include data employed by an autonomy system 114 to determine an action. For example, an autonomy system 114 can execute a navigational (e.g., an action in which a vehicle changes a route or changes movement) or non-navigational action (e.g., activation of a non-route based control system of the vehicle, such as activation of a light or speaker of the vehicle) based on a road closure, congestion, weigh station delay time, weather data, or other action data 324.

Path data 326 may include or refer to information corresponding to a path of travel for a vehicle such as an autonomous vehicle 102. The path data 326 can include one or more waypoints for a path of travel for a vehicle, or instructions corresponding to traversing the path. For example, the path data 326 can include a speed restriction along the path, an expected travel time for the path, instructions to transit the path (e.g., lane guidance), or an indication to turn. The path data 326 may include objects or events disposed there along. For example, path data 326 can include an indication of an object in or along the roadway, including an identified object of a predefined set of objects, identification thereof (e.g., road-killed wildlife, tire carcasses, etc.). The path data may include congestion. Merely for ease of presentation, various examples are provided herein referring to various path data 326 such as detours, congestions, and the like. Such examples may be subsided for various examples of path data 326, and are not intended to be limiting. For example, a reference to a rockslide may be substituted for another (un)defined object along the roadway.

Audio data 328 may include or refer to a data structure such as audio file, or a stream such as a radio broadcast, adaptive bitrate streaming protocol, real-time messaging protocol, or so forth. The audio data 328 can include transcribed speech, compressed speech, feature vectors, phenomes or so forth. The audio data 328 can include information corresponding to the speech data, such as a time of transmission, energy or directionality associated with the speech. The audio data 328 may include sirens, horns, or other audible content, or the like. The audio data 328 may include a transmission channel, which the server 122 can correlate to a direction of travel, severity, data type, location, or so forth, such as according to a look-up table. The audio data 328 may include speech or other signatures which may indicate an identity of an origin of the speech, which the server 122 can detect or employ, such as to determine that multiple messages correspond to a same vehicle.

The at least one content association engine 302 can associate content with audio data 328 received over a citizens band (CB) radio channel. A CB radio channel may include or refer to a portion of radio spectrum available for voice communications. The particular frequencies may vary according to a mode, municipality, or the like. For example, in some instances, the CB radio channel can include one of a set of 40 channels from about 26.965 MHz to about 27.405 Mhz. The content association engines 302 can receive information broadcast over the CB radio channel. The information can include speech of various vehicle operators, dispatchers, or other persons. The content association engines 302 can receive audio data 328 corresponding to the speech.

The content association engine 302 can generate a transcript from the audio data 328. The content association engine 302 can do so by executing a natural language processing protocol. For example, the content association engine 302 can preprocess audio by filtering or amplifying the audio signal to enhance speech quality (e.g., filter the received content through a band pass filter in the range of human speech, a portion thereof, or harmonics corresponding thereto). The content association engine 302 can employ preprocessing techniques for CB radios 124, such as based on a frequency range which is recoverable over the CB channel, or based on a frequency response typical of CB radio microphones, such as to exclude road noise which is within an expected frequency band. The content association engine 302 can extract features from the preprocessed audio to generate a plurality of feature vectors, which may thereafter be matched with phenomes to generate a phenome sequence. The phenome sequence may thereafter be modeled according to one or more natural language processing (NLP) models to generate a sequence of words corresponding to the transcript of the audio content. The sequence of words may be referred to herein as the transcript. The NLP model can determine a value (e.g., a confidence or confidence score) for each of a plurality of events such as by further employing the one or more further models, or based on the weights. For instance, the higher the number of words (e.g., the aggregate weight of such words) identified by the content association engine 302 that match an event, the higher the value for the event.

The content association engine 302 can generate additional information from the audio data 328. For example, the content association engine 302 can detect other audio content such as a tone, volume, or cadence of speech. The content association engine 302 can determine, based on a sequence of feature vectors or phenomes, additional information corresponding to horns, sirens, or other non-speech data.

The content association engine 302 can generate a weight or other representation corresponding to the words of the transcript. For example, the content association engine 302 can associate a predefined weight with one or more words or combination of words (e.g., phrases). For example, a word such as brake may include a different weight, related, unrelated, or orthogonal vector relative to "break down." The weight may correspond to one or more events. For example, the word "roadkill" may have a weight of 0.9 corresponding to a struck animal, a weight of 0.4 corresponding to traffic congestion, and a weight of 0.01 corresponding to roadway flooding. The content association engine 302 can generate a net weight corresponding to the audio content generated from the audio data 328. For example, the content association engine 302 can generate a weight for one or more events by summing the weights of the audio data 328, and may be normalized by a transmission time, number or words, or the like.

The content association engine 302 can include or modify a weight based on other information in the audio data 328. For example, excited tones, rapid speech, horns, or sirens may correspond to an additional weight or a weight adjustment to a weight generated for the transcript. A lengthy transmission may have a weight adjusted based on a temporal or word density (e.g., term frequency-inverse document frequency (TD-INF)).

The content association engine 302 can identify a word corresponding to a location, such as based on a list of predefined words associated with a location. The list of predefined words, phrases, or grams may be words that correspond generally to a location (e.g., north, south, shoulder, left lane, intersection, etc.), or may be specific to one or more areas. For example, the list of predefined words may be words associated with a particular location such as a set of words employed in a region (e.g., chestnut avenue, lakefront park, Lambeau Field). The content association engine 302 can provide the words to the location engine 304, described in greater detail henceforth.

The content association engine 302 can include a classifier to determine an event corresponding to the audio data 328. For example, the classifier can be or include a machine learning classifier. The classifier may vectorize audio data 328 based on the transcript (e.g., based on words or another n-gram such as a three character sequence), or the feature vectors or phenomes of the speech. The machine learning models can include, for example, a support vector machine (SVM) model, a neural network, or a random forest. The depicted models are not intended to be limiting. According to various embodiments, machine learning models of a different type or an ensemble of machine learning models may be employed.

A support vector machine (SVM) model can classify an event corresponding to audio data 328. The content association engine 302 can place the vectorized audio data 328 into a multidimensional plane including various locations or clusters corresponding to various potential events. The SVM model can determine a line or hyperplane separating a first set of potential events from a second set of potential events. The vector corresponding to the audio data 328 may be disposed on a first or second side of the line or hyperplane. The SVM model can employ multiple iterations until only one event of the set of potential events is on the selected side of a hyperplane. The SVM model can include more than one line or hyper plane to define a volume of the vector space associated with the various predefined events.

The server 122 can train (e.g., retrain) the SVM or other machine learning models based on traffic responses to previous detected events, human tagging, or tagging by one or more models. For example, predictions which do not lead to traffic congestion or other indications of disturbed travel along a path may be provided as feedback, via a loss function, of an incorrect prediction, and predictions associated with predictions or other indications of disturbed travel along the path may provide, as feedback, (e.g., damage to a vehicle, detours, or the like) which may be indicative of a correct prediction. In various embodiments, the SVM model can be replaced with another model, such as another clustering model (e.g., k-means, mean-shift, or a hierarchical clustering model).

A neural network can include a stack of distinct layers that transform a variable number of inputs being ingested by an input layer, into an output at the output layer. The inputs to the neural network can correspond to a vector representation of the transcript, feature vectors, or phenomes as an input feature set (e.g., predictors). The output of the neural network can correspond to a probability or confidence of one or more events. Various hidden layers disposed between the input and the output can form connection biases between layers, such that in response to a receipt of events corresponding to the vector representation of the audio data 328, a probability for each of the outputs can be computed. The strength of associations between various nodes of the hidden, input, or output layers can be based on training data. The training data can comprise previous audio data 328 which is human tagged, or based on previous results such as traffic, damage to vehicles, detours, or other path data 326.

The neural network can output a predicted match score to various events of the output layer. For example, the output may be a vector of real numbers corresponding to each predefined event. In one example, the real numbers may be input into a softmax classifier. A softmax classifier uses a softmax function, or a normalized exponential function, to transform an input of real numbers into a normalized probability distribution over predicted output classes. For example, the softmax classifier may indicate the probability of the output being in class A, B, C, etc. As, such the softmax classifier may be employed because of the classifier's ability to classify various classes, which each correspond to an event. Other classifiers may be used to make other classifications. For example, the sigmoid function makes binary determinations about the classification of one class (i.e., the output may be classified using label A or the output may not be classified using label A), which may be employed to verify a predicted event, or determine an event when various events may exist simultaneously (e.g., a traffic accident may further correspond to a detour, a speed, restriction and a change in a road surface to a gravel road). The server 122 can train the neural network via back-propagation, based on known relationships between an event and audio data 328. In some embodiments, the model may be trained with a cross-entropy function loss function to adjust biases or weights between layers, such as originating at an output layer where a predicted probability (e.g., 0.15) can be compared to an known value (e.g., one or zero) such that the magnitude of the error indicated by the loss function is highest for an incorrect prediction proximal to one or zero, and lower for incorrect predictions having lower probability, which may reduce high confidence predictions which are inaccurate.

A random forest model can receive the audio data 328 or a representation thereof. The random forest model can include any number of individual decision trees (e.g., about 200 decision trees). The branches for the trees can be based on, for example, the known relationships described above. The decision trees can include a minimum or maximum number of layers for the individual decision trees (e.g., between two and ten layers). According to some embodiments, the branches may be determined by various techniques such as information gain or Chi-square techniques. A confidence level of the random forest model can depend on a confidence of the random forest (e.g., a number of decision trees selecting a domain of the domain set). In some embodiments, the confidence level of the random forest model can depend on a correct classification rate of test data (e.g., the out-of-bag data to test individual decision trees, or separate test data not used to train any decision trees of the random forest).

The random forest model can output one or more predicted events, and may determine a confidence for each prediction, such as according to a number or attribute of trees sharing a same classification. For example, a random forest wherein 150 of 200 trees predict a particular classification may correlate to higher confidence than a random forest wherein 100 of 200 trees predict the particular classification.

The content association engine 302 can determine a confidence or severity associated with an event. For example, the machine learning model may provide a confidence associated with the event. In some embodiments, the association engine can include a confidence threshold to compare the output of the various predictions (e.g., weightings or models), and suppress predicted events which do not meet the confidence thresholds. Suppression may refer to or include logging only, taking no action based upon, or using only for training data. The confidence or severity may be adjusted based on additional audio data 328. For example, the additional audio data 328 can correspond to additional transmissions over the CB radio channel. The additional audio data 328 may correspond to audio data 328 transmitted from a same or different source. For example, the content association engine 302 can determine a number of transmissions received from a same or different sources, and adjust a confidence or severity based on the number of transmissions of the number of sources (e.g., increase the confidence or severity the higher the number of transmissions or sources). Repeated transmissions from a single vehicle, dispatcher, or other source may be indicative of a higher confidence or severity than a single transmission from a single source. Repeated transmissions from several sources may be indicative of a higher confidence or severity than repeated transmission from a single source. Likewise, a transmission from a dispatcher, commercial vehicle, or dispatcher may be associated with a different confidence or severity (e.g., different sources or types of sources may correspond with different severities or weighting for determining the severity or confidence for an event).

The content association engine 302 can determine the audio data 328 and additional audio data 328 correspond to the event based on a difference between a content of the audio data 328 and an additional content of the additional audio data 328. The difference may be determined based on a temporal or geographic distance in transmissions. For example, proximal transmissions may be related to a same event, as vehicle operators reply to questions, provide suggestions, convey their own observations, and so forth. The difference can be determined based on one or more the data spaces associated with a vector corresponding to the audio data 328 and the additional audio data 328. For example, a vector associated with the audio data 328 and a vector associated with the additional audio data 328 can be projected onto a vector space. A distance between the vectors can be determined, such as according to a Euclidean distance, Manhattan distance, Chebyshev distance, or cosine similarity. Thereafter, the distance can be compared to a threshold. If the distance is less than a threshold, the content association engine 302 can determine that the difference between the vectors is indicative of a same event. If the distance is greater than a threshold, the content association engine 302 can determine that the difference between the vectors is indicative of a different event. In some embodiments, further distances can be determined. For example, the distance of either of the vectors from a cluster centroid or boundary, or other defined portion of the vector space may be indicative of a same or different event. In some embodiments, the difference can be determined according to the weighted score discussed above. The random forest can determine a difference based on a number of shared prediction tree outcomes. A weighted event prediction based on word or gram weights may determine a difference based on a prediction of one or more events. For example, an indication which is associated with weights for both a flooding event and a temporary lane closure event can be determined to be associated with the same event, even where the event is not determined to be "flooding" or "temporary lane closure."

A severity may refer to or be associated with an intensity, size, level of impact, or duration of time for an event. For example, a severe traffic accident may include a 50-vehicle pileup which extends over a large geographic area, blocks several lanes of traffic, and persist for an extended clearance time. A severity can be sorted into one or more classifications such as "mild" "moderate" and "severe." In some embodiments, a severity can correspond to various classifications according to an event type. For example, flooding can be categorized as "passable" "passable by class 8 trucks" and "non-passable."

The content association engine 302 can determine or adjust a source, severity, or confidence based on the channel of the CB radio 124. For example, a channel may be indicative of an emergency, commercial transit, law enforcement activities, or the like. Some channels may be employed for north south travel as opposed to east-west, or for highway systems as opposed to surface streets. A channel may be associated with a weight or an adjustment to a weight, or may be input to a machine learning model to determine an event.

The content association engine 302 can ingest location data (e.g., geolocation data) from the location engines 304 to determine an event. For example, the location engine 304 can determine a location for an event at an area with frequent congestion, accidents, deer strikes, flooding, or the like. The content association engine 302 can adjust a weight, confidence, or severity based on the location. For example, responsive to receiving a location corresponding to a railroad crossing, the content association engine 302 can upwardly adjust (e.g., increase) a weight or confidence corresponding to congestion. Responsive to receiving a location corresponding to a riverfront, the content association engine 302 can upwardly adjust a weight or confidence corresponding to flooding.

The location engine 304 can determine a location corresponding to the event. The location engine 304 can determine the location based on audio content, such as words extracted from the audio data by the content association engine 302, and conveyed to the location engine 304. For example, the location engine 304 may determine a location based on various words which may be indicative of one or more locations, such as road names, mile markers, intersections or indications thereof (e.g., "onramps," "off-ramps," "traffic lights," etc.). The location engine 304 can ingest words associated with locations from a mapping service. For example, the location engine 304 can determine a location based on an association between the location and a name received from a mapping service. Such names can include roadways, roadway names, or other names such as parks, prominent places, municipal border, mile markers, neighborhoods, or the like. The corresponding location may be referred to as geolocation data.

The location engine 304 can determine the location based on geolocation data received with the audio data from a vehicle corresponding to the audio data. For example, the location engine 304 can receive audio data from a vehicle with metadata indicating the location of the vehicle when the audio data was transmitted. The location engine 304 can identify the location of the event from the metadata.

The location engine 304 can determine the location based on an area of potential transmission, such as based on the transmission power of a radio. For example, the location engine 304 can determine that a radio transmission is within a certain distance based on an estimated or typical transmission power (e.g., 4 watts), such that receipt of communication over a CB radio channel may be indicative of a location of a sending unit. The location may refer to the location of the server 122, or another location, as in the case of a relayed communication from the sender to the receiver. The location engine 304 can receive one or more relayed signals from one or more autonomous vehicles 102 in one or more locations. Further, the location engine 304 may be in network communication with any number of autonomous vehicles 102 which do not relay a message. The location engine 304 may determine, based on the combination of local receipt (or a lack thereof), along with the relayed receipt (or lack thereof) from one or more autonomous vehicles 102 which are in network communication, a location. For example, the location engine 304 can determine a range for the various signals (e.g., a circle based on a radius associated with a transmission distance, which may be adjusted to account for terrain features, radio interference, or the like).

The location engine 304 can determine the area of potential transmission based on energy levels or time delays associated with the transmissions (e.g., from a source or relayed). For example, the location engine 304 can receive an input from a directional antennae indicating a direction of the source of the audio data 328, or can receive multipole indications of the audio data 328 which may include varying time delays or energy levels such that a source location can be triangulated. The location engine 304 may determine a minimum or maximum distance, such that a transmission range may be toroidal, or substantially so. The information associated with a transmission location may be referred to as geolocation data.

The location engine 304 can determine a location based on a combination of an area of potential transmission with words describing a geographic location. For example, the location engine 304 can determine a first region of high probability of potential transmission, determine a second region of moderate probability of potential transmission, and a third region of low probability of potential transmission (or a gradient probability function). The location engine may thereafter compare words or phases of spoken text to the areas of potential transmission. For example, where reference to "chestnut street" are present in the words, and chestnut street is in the first region, the location engine 304 can determine that the event takes place along chestnut street, or a portion thereof.

The location engine 304 can determine a geographic boundary for the location. For example, the geographic boundary can be a radius based on an event severity, or may be disposed along a feature (e.g., along a roadway for congestion, along a beachfront for flooding, or so forth). The geographic boundary can be any defined boundary. The geographic boundary can include one or more contiguous or non-contiguous portions. For example, an event such as a festival may be associated with a location which is distributed across a metro area, such that the associated geographic locations may be discontinuous, at least with respect to roadways.

The at least one pathing engine 306 can generate a path for an autonomous vehicle 102. For example, the path can be a path determined for the autonomous vehicle 102 or a prediction of a path locally determined by the autonomous vehicle 102. The path may include a route to traverse, a lane selection, path data 326, and so forth. The pathing engine 306 can predict a path based on a location of the autonomous vehicle 102, a speed of one or more autonomous vehicles 102, congestion data, or the like. The pathing engine 306 can predict a path based on a type of vehicle (e.g., a class 8 or class 7 truck). For example, a route may include a weight restriction, height restriction, or the like. The pathing engine 306 can predict a path based on a type of cargo or passengers. For example, the pathing engine 306 can determine or predict that autonomous vehicles 102 carrying flammable, toxic, valuable, oversized, or corrosive cargoes may traverse paths which are selected preferentially for highways relative to surface streets.

Based on the determination of the path, the pathing engine 306 or other portions of the server 122 can determine further vehicles in proximity of the event (e.g., the location of the event or the geographic boundary for the event). For example, the server 122 can determine a location of autonomous vehicles 102 to receive further information therefrom, or to determine a set of autonomous vehicles 102 which may be traversing a route that a detected event is relevant to. Thereafter, the server 122 can convey a transmission to the autonomous vehicles 102 based on their paths (e.g., a transmission configured to cause the vehicles to adjust an operation thereof). For example, the server 122 can select a subset of autonomous vehicles 102 which are relevant to the event, such as vehicles having paths intersecting the event within a time period associated with the event, or based on a distance from the event. For example, an autonomous vehicle 102 which will enter a location within 1 hour for a first event type or two hours for a second event type may be identified for receipt of a transmission configured to cause an adjustment to the autonomous vehicle 102.

In one example, the pathing engine 306 may only determine paths for vehicles (e.g., autonomous vehicles) that are within a defined radius or distance from the location of the event or the geographic boundary of the location. The pathing engine 306 may identify the geographic location data of vehicles for which such data is stored and identify any vehicles with geographic location data within such a defined radius or distance. The pathing engine 306 can determine paths for the identified vehicles. Accordingly, the pathing engine 306 may not determine paths for vehicles that would not realistically encounter the event.

The pathing engine 306 can determine an intersection (e.g., paths that include the location of the event or that cross over a geographic boundary for the event) between the location data corresponding to an event and the path data corresponding to one or more autonomous vehicles 102 (e.g., the vehicles for which the pathing engine 306 determined to be within the defined radius or distance of the location or geographic boundary of the event). For example, the pathing engine 306 can determine that one or more paths or routes of the path data transits through the geographic region associated with an event. The pathing engine 306 can identify any paths that cross over or into the location or the geographic boundary of the event. Such paths can be or include intersections. The pathing engine 306 can determine multiple intersections, such as an intersection of multiple potential paths of one autonomous vehicle 102, or an intersection of paths corresponding to multiple autonomous vehicle 102.

In some embodiments, the pathing engine 306 can determine an association score between a path and an event, such as based on a distance of transit within the geographic region, a number of percent of potential paths crossing through the region, or the like. In some embodiments, the geographic region can include one or more constituent areas corresponding to varying probabilities or severities. The pathing engine 306 can determine the association score based on the constituent areas. The pathing engine 306 can compare an association score to a threshold. Based on the comparison, the pathing engine 306 can interface with the action generator 308 to cause the autonomous vehicle 102 to adjust operation, based on the intersection of the path data with the location corresponding to the event.

The at least one action generator 308 can cause any autonomous vehicles (e.g., the autonomous vehicle 102) that are associated with a path that intersects (or is associated with an association score indicating a likely intersection) the location or geographic boundary of the event 102 to execute an action by conveying action data 324 thereto. In some embodiments, the action can include a change to a path for the autonomous vehicle 102. For example, the action generator 308 can cause the pathing engine 306 to determine a path or one or more candidate paths for the autonomous vehicle 102, which do not intersect with the geographic location corresponding to the event, or include a lower association score with the event that a predicted path of the autonomous vehicles 102. The action generator 308 can cause the autonomous vehicle 102 to perform a navigational action, or a non-navigational action. For example, the action generator 308 can convey (e.g., transmit) instructions comprising information which is indicative of the action and/or the event (e.g., the location or geographic boundary of the event or the type of event). Such information can cause an autonomy system 250 of the autonomous vehicle to determine an action (e.g., indicating that a leftmost lane is not passable may cause an autonomous vehicle 102 in the leftmost lane to change lanes, or an autonomous vehicle 102 in the rightmost lane to adjust a speed). In some cases, the action generator 308 may determine an action an transmit the action to the autonomous vehicle, with or without the information indicating the event (e.g., location or event type). The autonomous vehicle may receive the information or instructions and operate according to received information.

A navigational action may include or refer to a change in speed or direction. For example, the change in speed may correspond to a speed restriction (e.g., a speed restriction which is less than a current or planned speed). Likewise, a lane restriction or preference can cause the autonomous vehicle 102 to change a lane, or the autonomous vehicle 102 may proceed along a different roadway, responsive to a receipt of information from the server 122. The information from the server 122 may include an explicit instruction such as a maximum speed to travel, a particular lane or roadway to traverse, or so forth. The information from the server 122 may include an indication of the event, such that the autonomous vehicle 102 can select a different route, lane, speed, or so forth. The indication may include a Boolean indication, a prediction of a transit time associated with a path intersecting with a location corresponding to the event, a prediction of a fuel economy or passenger comfort along a route, or so forth.

A non-navigational action may include a retransmission to further autonomous or non-autonomous vehicles. For example, the retransmission can connect to vehicles which are not in network communication with the sever 122. The retransmission can provide information regarding the event, or solicit responses such as confirming a prediction of an event, location or the like. The non-navigational action can include data collection and conveyance. For example, an autonomous vehicle 102 which has passed an off-ramp to detour around an event may provide an indication of a transit time, or an indication of a presence or absence of an object. For example, the autonomous vehicle 102 can provide a speed of travel, or provide a Boolean indication of congestion, provide an indication of a closed lane, collision, deer strike along the roadway, or the like. The server 122 may ingest such information to determine a difference between a predicted event, location, severity, etc. to measured information (e.g., a loss function). The server 122 may adjust one or more models based on the determined difference.

A non-navigational action can include an audible indication (e.g., horn honking to alert other users, such as incident to a navigation action (e.g. sudden braking), or separately therefrom. A non-navigational action can include a visual indication such as an engagement or disengagement of headlights, marker lights, or so forth. For example, a vehicle approaching congestion may engage hazard warning lights to signal other drivers to the congestion, which may reduce an occurrence of rear end accidents (e.g., upon a navigation action taken by the autonomous vehicle 102 or another vehicle in response to a traffic condition such as sudden braking or a lane changes).

In various embodiments, the action can be selected by the server 122 or the autonomous vehicle 102. For example, the server 122 can select an action to cause the autonomous vehicle 102 to avoid or enter (e.g., preferentially enter) the event. The server 122 can select a route to reduce travel time, fuel use, carbon emissions, trip cost, a reduced risk of damage, or to avoid certain routes (e.g., routes which may not be suited to autonomous operation). The server 122 can select a route based on a local minimum or maximum of a cost function combining various costs (e.g., the travel time, fuel use, etc.). In various embodiments, the action can be selected by the autonomous vehicle 102. For example, the autonomous vehicle 102 can determine the action based on another cost function, which can further include local sensor data, such as a speed of traffic flow, a visible range, a density of other vehicles 104, or the like.

Figure 4:
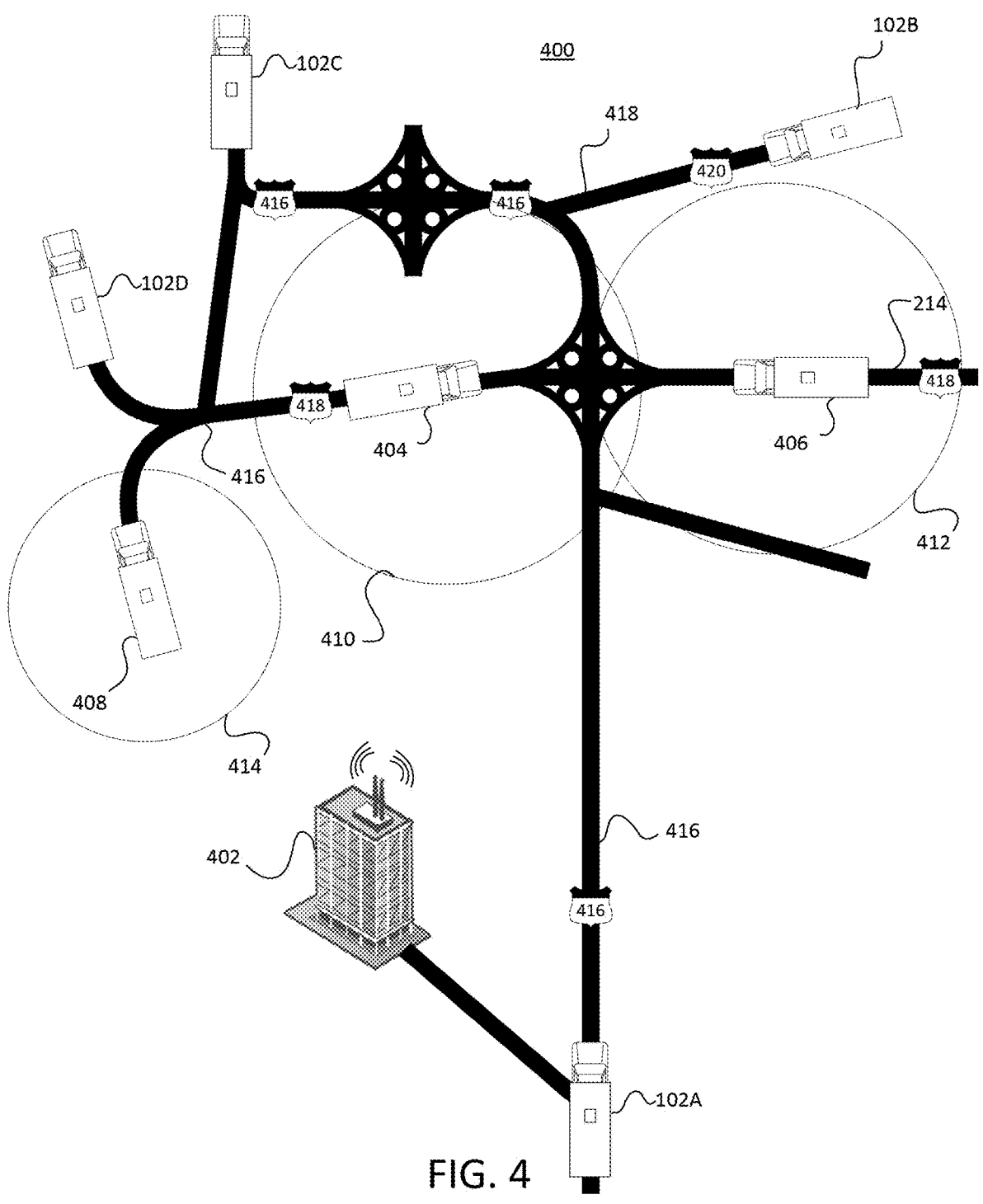
FIG. 4 is another bird's eye view of a roadway system including autonomous and non-autonomous vehicles, according to some embodiments.

FIG. 4 is another bird's eye view of a roadway system 400 including autonomous and non-autonomous vehicles, according to some embodiments. A dispatch office 402 can include one or more instances of the server 122 of FIG. 1. For example, the dispatch office 402 of FIG. 4 may be located at a fixed location including or known to the server 122. The dispatch office 402 may include one or more directional or non-directional antennae, each of which may monitor one or more CB radio channels. The depicted embodiment of the dispatch office 402 is not intended to be limiting. For example, in various embodiments of the present disclosure, the dispatch office 402 can be or include an autonomous or non-autonomous vehicle, a non-fixed location including one or more instances of a server 122, or a server 122 distributed across a plurality of autonomous vehicles 102.

The dispatch office 402 can include or interface with a mapping service including locations associated with roadways, roadway names, other names such as parks, prominent places, municipal border, mile markers, neighborhoods, or the like. Merely for ease of depiction, the depicted view includes a roadway system 400 including a highway network. The highway network includes a first route 416 extending in substantially a north-south direction and a second route 418 intersecting with the first route 416. The first route 416 further intersects with a third route 420.

The dispatch office 402 may be in network communication with various autonomous vehicles 102, such as a first autonomous vehicle 102A, a second autonomous vehicle 102B, and a third autonomous vehicle 102C. The dispatch office 402 may be in CB radio communication with various further vehicles such as a first audio data source vehicle 404, second audio data source vehicle 406, or third audio data source vehicle 408. The dispatch office 402 can determine a first location 410, second location 412, or third location 414 associated with one or more transmissions from the first audio data source vehicle 404, second audio data source vehicle 406, or third audio data source vehicle 408, respectively. For example, the dispatch office 402 may determine such locations based on a transmission location associated with the transmission, or audio content, such as location words. For example, the first location 410, second location 412, or third location 414 may correspond to an event location or a vehicle location. The first audio data source vehicle 404 and second audio data source vehicle 406 can transmit information associated with a same event proximal to their respective locations (e.g., a road closure). The third audio data source vehicle 408 may transmit information associated with a same event (e.g., a question or comment associated with the road closure), or information associated with a different event.

The dispatch office 402 can receive various audio data 328 corresponding to speech from the audio data source vehicles 404, 406, 408. The dispatch office 402 can determine an event based on first information in the speech. For example, each of the audio data source vehicles 404, 406, 408 can convey audio data 328 related to a collision between a red car with a blue sports utility vehicle which blocks the leftmost northbound lane of the first route 416. The dispatch office 402 can associate the audio data 328 with each other based on a temporal proximity of the respective communications, content of the speech (e.g., references to an intersection or onramp), or route names. The dispatch office 402 can determine an event location based on the first location 410, second location 412, or third location 414, or audio content. For example, the dispatch office 402 can determine that an event corresponds to the intersection of the first route 416 with the second route 418 based on an indication that the event is associated with an onramp, such that the event is likely to be associated with the intersection of the first route 416 with the second route 418 or the first route 416 with the third route 420. The dispatch office 402 can further determine that the third location 414 does not include the event (such no onramp is present, or based on the audio content of the speech corresponding thereto). The dispatch office 402 can determine that the intersection of the first route 416 with the second route 418 is included in both of the first location 410 and the second location 412, whereas the intersection of the first route 416 with the third route 420 is only included in the first location 410. The dispatch office 402 can receive an indication that the third autonomous vehicle 102C transited the intersection of the first route 416 with the third route 420 without delay and without detecting congestion.

Based on the various information, the dispatch office 402 can determine a location. For example, the determination may be a probabilistic determination, assigning an 80% likelihood of the event corresponds to a location of the leftmost northbound lane at the intersection of the first route 416 with the second route 418, and a 5% likelihood that the event corresponds to a location of the leftmost northbound lane at the intersection of the second route 418 with the third route 420. The dispatch office 402 can compare each likelihood to a threshold. The dispatch office 402 can determine that the likelihood of the event corresponding to the second route 418 with the third route 420 does not exceed the threshold, and take no action. The dispatch office 402 can determine that the likelihood of the event corresponding to the first route 416 intersecting with the second route 418 exceeds the threshold. Responsive to the comparison, the dispatch office 402 can predict that the first autonomous vehicle 102A has a path including the location. Responsive to the determination, the dispatch office 402 can convey information including the event and the location (e.g., "collision; lane closure; first route 416; lane 1; mile marker 123.45"). Responsive to the receipt of the information, the first autonomous vehicle 102A can, for example, change lanes to avoid the closed lane, determine a detour path, engage hazard lights to alert other vehicles of the hazard ahead, or so forth. In some embodiments, the information may include explicit restrictions such as imposing a maximum speed restriction of 50 miles per hour (MPH) and prohibiting operation in the left lane. In some embodiments, the information may be an input the vehicle autonomy system 250 which can cause the vehicle to take an action, such as a navigational action.

FIG. 5A is a flow diagram of an example method 500 of determining an association between an event and a vehicle, according to some embodiments. The method may be performed by one or more devices or elements of FIG. 1, 2, 3, or 4, such as an autonomous vehicle 102, a dispatch office 402, server 122, or another data processing system. It is noted that the method 500 is merely an example, and is not intended to limit the present disclosure. Accordingly, it is understood that additional operations may be provided before, during, and after the method 500 of FIG. 5A, and that some other operations may only be briefly described herein.

In brief overview, the method 500 includes operation 502 of receiving audio data 328. The method 500 includes operation 504, of determining a location corresponding to information associated with the audio data 328. The method 500 includes operation 506, of determining whether an event value satisfies a selection criteria (e.g., one or more criteria). The method 500 includes operation 508, of determining an event. The method 500 includes operation 510, of predicting a vehicle path intersection is predicted between a vehicle path and an event. The method 500 includes operation 512, of determining whether additional audio data 328 satisfies selection criterion. The method 500 includes operation 514, of conveying information to an autonomous vehicle 102 at a first severity responsive to a determination that the additional audio data 328 satisfies the selection criterion. The method 500 includes operation 516, of conveying information to the autonomous vehicle 102 at a second severity responsive to a determination that the additional audio data 328 fails to satisfies the selection criterion. As indicated above, various omission, substitutions or additions can be made to the method 500. For example, in some instances, an event determined at operation 506 or operation 508 may be conveyed to the all autonomous vehicles 102 or all autonomous vehicles identified at operation 510.

Referring again to operation 502, the method 500 includes receiving, by a data processing system, audio data 328. The data processing system can receive the audio data 328 from one or more vehicles, or other sources of audio data 328. For example, the data processing system can receive audio data 328 which is indicative of speech provided over a CB radio channel. The audio data 328 can be received in various formats, types, or pre-processing statuses. For example, the data processing system can receive the audio data 328 as a transcript from a relaying station (e.g., fixed station, autonomous vehicle 102, crewed vehicle, etc.). The data processing system can receive the audio data 328 as an audio file or a stream. The data processing system can receive the audio data 328 along with corresponding information. For example, the data processing system can receive the audio data 328 along with a location of a relaying station, an indication of signal direction, magnitude, energy level, or the like. In various embodiments, the data processing system can determine the same for local processing or provision to a further data processing system or portion thereof.

Referring again to operation 504, the method 500 includes determining, by the data processing system, a location corresponding to at least a portion of information in the speech. For example, the data processing system can determine the location based on the content of the speech (which may be extracted from the audio data 328), or other information provided along with the audio data 328 such as the signal strength, transmission time, channel, or the like. The location may include a geographic region such as extending along a roadway, terrain feature, or so forth. The data processing system may determine the location based on weather data, traffic data, or the like, which can be employed by the systems and methods described herein to determine a correspondence between an event and a location, such as comparing traffic congestion to an event associated with traffic congestion, or weather to an event associated with the weather.

Referring again to operation 506, the data processing system can determine whether an event value satisfies a selection criterion. For example, the selection criterion may correspond to one or more predefined events or a confidence interval. The data processing system can compare a value associated with an event, such as a prediction score or confidence score to the confidence interval. The event value may correspond to a confidence greater or lesser than a threshold that a detected event corresponds to the location predicted at operation 504. The event value may correspond to a confidence greater or lesser than a threshold that an event corresponds to one or more of a predefined list of events. For example, an event definition 322 can indicate a value of an event corresponding to congestion, traffic accidents, detours, or other path data 326. The event value can be or include a string, index value, or other representation of an event of the event definition 322. For example, audio content can include various discussions which are not indicative of an event, such as chatter concerning an amusing bumper sticker, or received information may not correlate strongly with one event, or with a set of events corresponding to a same information that is provided to an autonomous vehicle 102, such an indication to impose a speed restriction, avoid an area, or preferentially select a route. Responsive to a determination that the event value does not satisfy the selection criterion, the data processing system can advance the method 500 to operation 502. Subsequently, the data processing system can may receive further information (e.g., based on a temporal proximity thereto) to determine an event, which may, in combination with the previous information, cause the data processing system can to proceed to operation 508. It is noted that in some embodiments, operation 508 may precede operation 504, and the selection of a satisfaction criterion may cause the method 500 to proceed to operation 510, or can be modified to determine whether a location value satisfies a selection criterion.

Referring again to operation 508, the data processing system determines an event. The determination of the event may be based on the satisfaction of the selection criterion. The determination of the event may be further based on a selection between various events. For example, a satisfaction criterion may be met based on a combination of information which corresponds to various events which are indicative of a same action taken. At operation 508, the data processing system selects at least a most probable. In some embodiments, the data processing system may select a plurality of events. For example, each selection criterion satisfied at operation 506 may correspond to a determined event. In various embodiments, the data processing system may select the event prior or subsequent to operation 514 or operation 516. For example, the data processing system can determine the event subsequent to information communicated to an autonomous vehicles 102, which may be employed to evaluate, train, or otherwise control a machine learning model.

Referring again to operation 510, the data processing system can predict an autonomous vehicle 102 having a path including the location. For example, the method 500 can include receiving a path of an autonomous vehicle 102 and determining an intersection between the path and the location, or predicting a path based on a previous direction of travel, a known heading or destination, or the like. The data processing system can predict various autonomous vehicles having a path including the location. For example, the data processing system can determine a first set of one or more vehicles which are within a geometric distance, driving distance, driving time, or the like from the event. From the first set, the data processing system can determine a portion thereof which include one or more paths including the location.

Referring again to operation 512, the method 500 can include determining whether a quantity of additional audio data 328 satisfies a selection criterion. According to various embodiments, the data processing system can employ selection criterion (e.g., thresholds, classifications, or matches) to adjust a location, change a predicted event, bifurcate an event into separate events or combine various events to one event, and so forth. Such determinations may be generated responsive to one or more CB radio transmissions. For example, the depicted method 500 includes a selection criterion employed by the data processing system for a severity of events based on multiple receipts of audio data 328 (e.g., at least one transmission of operation 502, along with at least one further transmission). The reference to a further transmission is not intended to limit the method 500. First audio data 328 may be received at a first instance of operation 502, and second audio data 328 may be received at a second instance of operation 502. Either or both of the first and second audio data 328 may be employed incident to, for example, operation 504, operation 506, and operation 512. Responsive to a satisfaction of the criterion, such a value exceeding or being less than a threshold, the method 500 can proceed to operation 514. Responsive to the non-satisfaction of the criterion, such a value exceeding or being less than a threshold, the method 500 can proceed to operation 516.

Referring again to operation 514, the method 500 can include conveying information (e.g., a message or second information) to the autonomous vehicle 102 to adjust an operation thereof. The message may indicate a first severity. For example, the first severity may correspond to a high impact, a first number of minutes delay, or so forth. For example, the message may include or correspond to a first speed restriction or a first preference adjustment for a lane, route, or the like. The first severity, high impact, first number of minutes delay first speed restriction, or first preference adjustment may differ from a second severity, low impact, second number of minutes delay, second speed restriction, second preference adjustment, or so forth which may be conveyed at operation 516, responsive to the non-satisfaction of the criterion.

FIG. 5B is a flow diagram of an example method 550 of determining an association between an event and a vehicle, according to some embodiments. The method 550 may be performed by one or more devices or elements of FIG. 1, 2, 3, or 4, such as an autonomous vehicle 102, a dispatch office 402, server 122, or another data processing system. It is noted that the method 550 is merely an example, and is not intended to limit the present disclosure. Accordingly, it is understood that additional operations may be provided before, during, and after the method 550 of FIG. 5B, and that some other operations may only be briefly described herein.

At operation 552, the method 550 can include receiving audio data indicating speech from a citizens band (CB) radio channel. At operation 554, the method 550 can include determining a location corresponding to first information in the speech. At operation 556, the method 550 can include determining an event at the location based on the first information. At operation 558, the method 550 can include predicting one or more autonomous vehicles that have a path including the location. At operation 560, the method can include transmitting second information containing the event and the location to the one or more autonomous vehicles. The second information can cause the one or more autonomous vehicles to adjust operation according to the event and the location.

Figure 6:
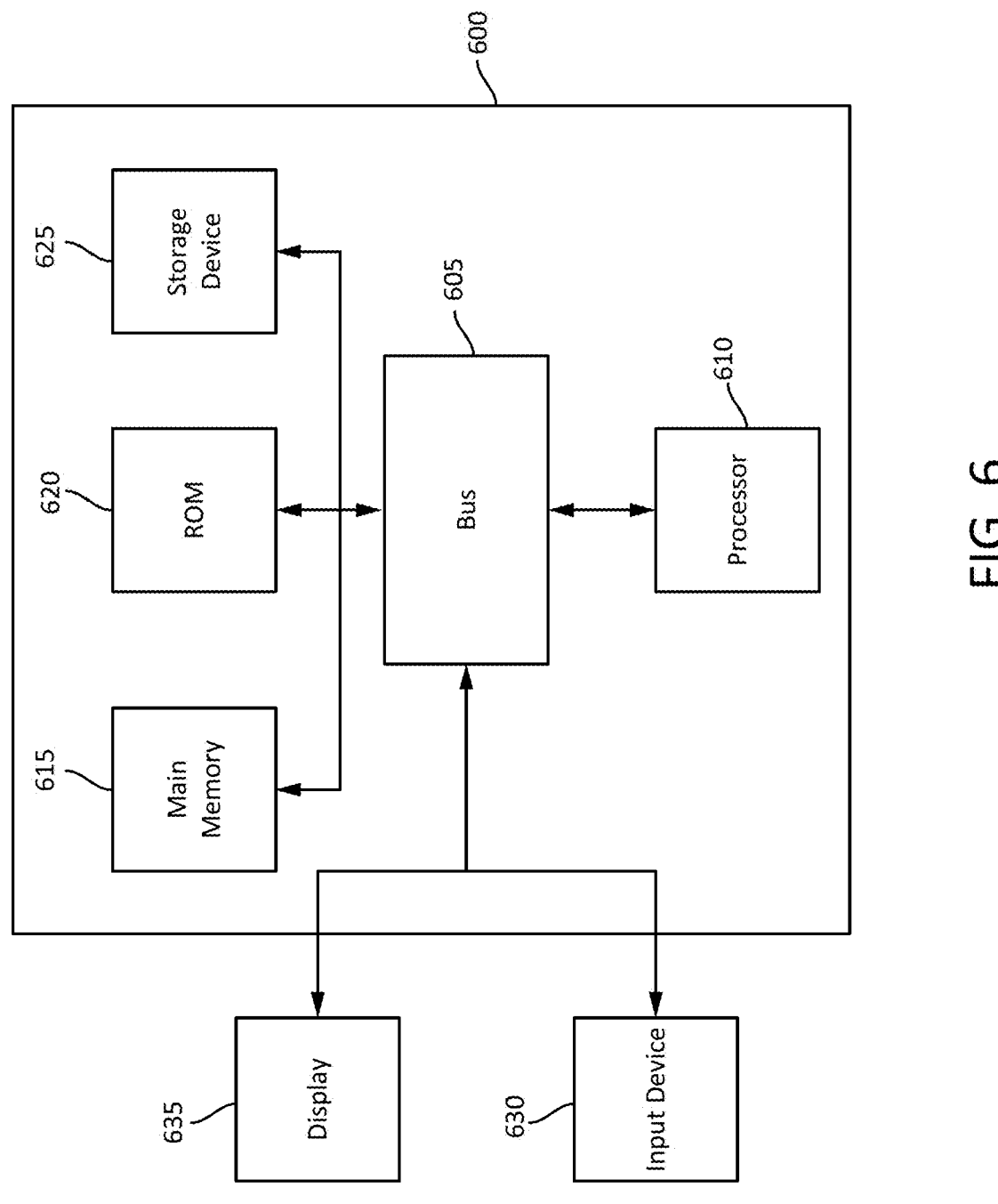
FIG. 6 is a block diagram illustrating an architecture for a computer system that can be employed to implement elements of the systems and methods described and illustrated herein.

FIG. 6 is a block diagram illustrating an architecture for a computer system that can be employed to implement elements of the systems and methods described and illustrated herein, including, for example, the systems depicted in FIG. 1 and FIG. 2, and the methods depicted in FIG. 5A and FIG. 5B. The computing system 600 includes at least one bus 605 or other communication component for communicating information and at least one processor 610 or processing circuit coupled to the bus 605 for processing information. The computing system 600 can also include one or more processors 610 or processing circuits coupled to the bus for processing information. The computing system 600 also includes at least one main memory 615, such as a random access memory (RAM) or other dynamic storage device, coupled to the bus 605 for storing information, and instructions to be executed by the processor 610. The main memory 615 can be used for storing information during execution of instructions by the processor 610. The computing system 600 may further include at least one read only memory (ROM) 620 or other static storage device coupled to the bus 605 for storing static information and instructions for the processor 610. A storage device 625, such as a solid state device, magnetic disk or optical disk, can be coupled to the bus 605 to persistently store information and instructions.

The computing system 600 may be coupled via the bus 605 to a display 635, such as a liquid crystal display, or active matrix display, for displaying information to a user such as a driver of a vehicle or another end user. An input device 630, such as a keyboard or voice interface may be coupled to the bus 605 for communicating information and commands to the processor 610. The input device 630 can include a touch screen display 635. The input device 630 can also include a cursor control, such as a mouse, a trackball, or cursor direction keys, for communicating direction information and command selections to the processor 610 and for controlling cursor movement on the display 635.

The processes, systems and methods described herein can be implemented by the computing system 600 in response to the processor 610 executing an arrangement of instructions contained in main memory 615. Such instructions can be read into main memory 615 from another computer-readable medium, such as the storage device 625. Execution of the arrangement of instructions contained in main memory 615 causes the computing system 600 to perform the illustrative processes described herein. One or more processors in a multi-processing arrangement may also be employed to execute the instructions contained in main memory 615. Hard-wired circuitry can be used in place of or in combination with software instructions together with the systems and methods described herein. Systems and methods described herein are not limited to any specific combination of hardware circuitry and software.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code, it being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc, where "disks" usually reproduce data magnetically, while "discs" reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

Various descriptions, herein, make use of the word "or" to refer to plurality alternative options. Such references are intended to convey an inclusive or. For example, various server 122 components herein can include hardware or software components. Such a disclosure indicates that the components may comprise a hardware component, a software component, or both a hardware and a software component.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system, comprising:

one or more processors configured to:

receive audio data including speech from a citizens band (CB) radio channel;

identify first information contained in the speech;

determine a location corresponding to the first information in the speech based at least in part on an origin location of the audio data and the first information identified in the speech;

determine an event at the location based on the first information;

predict one or more autonomous vehicles that have a path including the location; and transmit second information containing the event and the location to the one or more autonomous vehicles, the second information causing the one or more autonomous vehicles to adjust operation according to the event and the location, wherein determining the location of the event using both the origin location of the audio data and the first information identified in the speech enables the use of CB radio transmissions in predicting one or more autonomous vehicles that have a path including the location of the event.

2. The system of claim 1, wherein the second information comprises an indication to perform a navigational action according to the event and the location.

3. The system of claim 1, wherein the audio data comprises a transcript of audio content conveyed over the CB radio channel.

4. The system of claim 1, wherein the one or more processors are configured to:

generate a transcript from the audio data, and wherein the event and the location are determined based on the transcript.

5. The system of claim 4, wherein the one or more processors are configured to determine the event by:

executing a natural language processing protocol using the transcript as input to determine a value for each of a plurality of events; and selecting the event based on the value for the event satisfying a selection criterion.

6. The system of claim 1, wherein the one or more processors are configured to:

determine the location based on geolocation data received with the audio data from a vehicle corresponding to the audio data.

7. The system of claim 1, wherein the one or more processors are configured to predict that the one or more autonomous vehicles that have a path including the location by:

receiving path data for the one or more autonomous vehicles;

determining a geographic boundary for the location based on the audio data; and determining an intersection between the location and the path data.

8. The system of claim 1, wherein the one or more processors are configured to determine the event corresponding to one of:

a speed of traffic along a roadway being less than a predefined threshold;

a closure of the roadway; or an identification of a defined object along the roadway.

9. The system of claim 1, wherein the one or more processors are configured to:

determine a severity associated with the event based on a quantity of additional audio data received indicating the event, the additional audio data being associated with a plurality of transmissions over the CB radio channel.

10. The system of claim 1, wherein the one or more processors are configured to:

determine the audio data and additional audio data correspond to the event based on a difference between a content of the audio data and an additional content of the additional audio data.

11. The system of claim 10, wherein the one or more processors are configured to:

determine a confidence interval associated with the event based on a quantity of additional audio data received, the additional audio data being associated with a plurality of transmissions of the citizens band (CB) radio channel.

12. A method, comprising:

receiving, by one or more processors, audio data including speech from a citizens band (CB) radio channel;

identifying first information contained in the speech;

determining, by the one or more processors, a location corresponding to the first information in the speech based at least in part on an origin location of the audio data and the first information identified in the speech;

determining, by the one or more processors, an event at the location based on the first information;

predicting, by the one or more processors, one or more autonomous vehicles that have a path including the location; and transmitting, by the one or more processors, second information containing the event and the location to the one or more autonomous vehicles, the second information causing the one or more autonomous vehicles to adjust operation according to the event and the location, wherein determining the location of the event using both the origin location of the audio data and the first information identified in the speech enables the use of CB radio transmissions in predicting one or more autonomous vehicles that have a path including the location of the event.

13. The method of claim 12, wherein the second information comprises an indication to perform a navigational action according to the event and the location.

14. The method of claim 12, wherein the second information comprises an additional path for the one or more autonomous vehicles to traverse, the additional path not including the location.

15. The method of claim 12, comprising:

generating, by the one or more processors, a transcript from the audio data, wherein the event and the location are determined based on the transcript;

executing a natural language processing protocol using the transcript as input to determine a value for each of a plurality of events; and selecting, by the one or more processors, the event based on the value for the event satisfying a selection criterion.

16. The method of claim 12 comprising:

receiving, by the one or more processors, path data for the one or more autonomous vehicles;

determining, by the one or more processors, a geographic boundary for the location based on the audio data; and determining, by the one or more processors, an intersection between the location and the path data, wherein prediction of the one or more autonomous vehicles having the path including the location is determined responsive to the intersection.

17. The method of claim 12, comprising:

receiving, by the one or more processors, geolocation data for a vehicle associated with the audio data, wherein the location is determined based on the geolocation data.

18. The method of claim 17, wherein the geolocation data corresponds to a source of the speech.

19. The method of claim 17, comprising:

receiving, by the one or more processors, the audio data from one of the one or more relaying autonomous vehicles, the one of the one or more autonomous vehicles relaying the audio data from a source of the speech, wherein the geolocation data corresponding to the source of the speech is generated by the one or more relaying autonomous vehicles.

20. The method of claim 12, comprising:

determining, by the one or more processors, a severity associated with the event based on a quantity of additional audio data received indicating the event, the additional audio data being associated with a plurality of transmissions of the CB radio channel.

\* \* \* \* \*